(12) United States Patent
Song et al.

(10) Patent No.: US 9,817,447 B2
(45) Date of Patent: Nov. 14, 2017

(54) METHOD, DEVICE, AND SYSTEM FOR RECOGNIZING GESTURE BASED ON MULTI-TERMINAL COLLABORATION

(71) Applicant: Huawei Technologies Co., Ltd., Shenzhen (CN)

(72) Inventors: Xingguang Song, Beijing (CN); Shiguo Lian, Beijing (CN); Wei Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 14/567,253

(22) Filed: Dec. 11, 2014

(65) Prior Publication Data

US 2015/0186006 A1     Jul. 2, 2015

(30) Foreign Application Priority Data

Dec. 30, 2013   (CN) .......................... 2013 1 0746679

(51) Int. Cl.
*G06F 3/0488* (2013.01)
*G06F 1/16* (2006.01)
(Continued)

(52) U.S. Cl.
CPC ............ *G06F 1/1694* (2013.01); *G06F 3/017* (2013.01); *G06F 3/0346* (2013.01); *G06F 2200/1637* (2013.01); *G06F 2203/04806* (2013.01)

(58) Field of Classification Search
CPC .... G06F 1/1615; G06F 1/1626; G06F 1/1647; G06F 1/166; G06F 1/1677;
(Continued)

(56) References Cited

U.S. PATENT DOCUMENTS 6,243,074 B1    6/2001  Fishkin et al.
7,636,794 B2    12/2009 Ramos et al.
(Continued)

FOREIGN PATENT DOCUMENTS

CN        1894738 A     1/2007
CN      101674364 A     3/2010
(Continued)

OTHER PUBLICATIONS

Foreign Communication Form A Counterpart Application, Korean Application No. 10-2014-0193129, Korean Office Action dated May 18, 2016, 5 pages.
(Continued)

*Primary Examiner* — Anil Bhargava
(74) *Attorney, Agent, or Firm* — Conley Rose, P.C.

(57) ABSTRACT

A method, a device, and a system are provided for recognizing a gesture based on multi-terminal collaboration, which are used to recognize an air gesture operation of a user in a multi-terminal collaboration scenario. The method includes receiving, by a first terminal after receiving a collaboration request activation signal, parameter information of second terminals; recording, by the first terminal according to the parameter information of the second terminals, an arrangement manner of terminals that participate in acquiring of gesture information, where the terminals that participate in the acquiring of the gesture information include all terminals or the second terminals; receiving, by the first terminal, sensor trigger information sent by at least one second terminal; and determining, by the first terminal according to the recorded arrangement manner and the acquired sensor trigger information, a type of a gesture that triggers a sensor.

16 Claims, 9 Drawing Sheets

(51) Int. Cl.
*G06F 3/0346* (2013.01)
*G06F 3/01* (2006.01)

(58) Field of Classification Search
CPC ............ G06F 3/04886; H04M 1/0208; H04M 1/0245; H04M 1/0247; H04M 1/23; H04M 1/7253; H04M 2250/12; H04M 2250/64
See application file for complete search history.

(56) References Cited

U.S. PATENT DOCUMENTS

| | | | |
|---|---|---|---|
| 9,086,837 B1 * | 7/2015 | Kang | G06F 3/016 |
| 9,348,365 B2 * | 5/2016 | Gillis | G06F 1/1626 |
| 9,635,091 B1 * | 4/2017 | Laukkanen | H04L 67/025 |
| 2005/0093868 A1 | 5/2005 | Hinckley | |
| 2005/0168399 A1 | 8/2005 | Palmquist | |
| 2005/0212751 A1 | 9/2005 | Marvit et al. | |
| 2007/0124503 A1 | 5/2007 | Ramos et al. | |
| 2008/0216125 A1 | 9/2008 | Li et al. | |
| 2010/0313143 A1 | 12/2010 | Jung et al. | |
| 2011/0018821 A1 | 1/2011 | Kii | |
| 2011/0090155 A1 | 4/2011 | Caskey et al. | |
| 2011/0154248 A1 | 6/2011 | Tsuruoka | |
| 2011/0209039 A1 | 8/2011 | Hinckley et al. | |
| 2011/0209057 A1 | 8/2011 | Hinckley et al. | |
| 2011/0209058 A1 | 8/2011 | Hinckley et al. | |
| 2011/0209089 A1 | 8/2011 | Hinckley et al. | |
| 2011/0209100 A1 | 8/2011 | Hinckley et al. | |
| 2011/0209101 A1 | 8/2011 | Hinckley et al. | |
| 2011/0209102 A1 | 8/2011 | Hinckley et al. | |
| 2011/0209103 A1 | 8/2011 | Hinckley et al. | |
| 2011/0209104 A1 | 8/2011 | Hinckley et al. | |
| 2011/0231783 A1 | 9/2011 | Nomura | |
| 2011/0249024 A1 | 10/2011 | Arrasvuori et al. | |
| 2012/0081302 A1 | 4/2012 | Gimpl et al. | |
| 2012/0081303 A1 | 4/2012 | Cassar et al. | |
| 2012/0081307 A1 | 4/2012 | Sirpal et al. | |
| 2012/0117495 A1 | 5/2012 | Sirpal et al. | |
| 2012/0124490 A1 | 5/2012 | Sirpal et al. | |
| 2012/0256963 A1 | 10/2012 | Suzuki et al. | |
| 2013/0076715 A1 | 3/2013 | Selim | |
| 2013/0076781 A1 | 3/2013 | Sirpal et al. | |
| 2013/0080933 A1 | 3/2013 | Reeves et al. | |
| 2013/0080934 A1 | 3/2013 | Reeves et al. | |
| 2013/0080935 A1 | 3/2013 | Reeves et al. | |
| 2013/0080936 A1 | 3/2013 | Reeves et al. | |
| 2013/0080939 A1 | 3/2013 | Reeves et al. | |
| 2013/0082919 A1 * | 4/2013 | Jano | H04M 1/0208 345/156 |
| 2013/0176266 A1 | 7/2013 | Kao et al. | |
| 2014/0218266 A1 | 8/2014 | Chen et al. | |
| 2015/0023138 A1 | 1/2015 | Liu et al. | |

FOREIGN PATENT DOCUMENTS

| | | |
|---|---|---|
| CN | 101924675 A | 12/2010 |
| CN | 101930333 A | 12/2010 |
| CN | 102193629 A | 9/2011 |
| CN | 102739696 A | 10/2012 |
| CN | 103218105 A | 7/2013 |
| CN | 103259911 A | 8/2013 |
| CN | 103344959 A | 10/2013 |
| EP | 2241963 A1 | 10/2010 |
| EP | 2503446 A2 | 9/2012 |
| EP | 2579556 A1 | 4/2013 |
| JP | H09138730 A | 5/1997 |
| JP | 2003271118 A | 9/2003 |
| JP | 2010250465 A | 11/2010 |
| JP | 2011048610 A | 3/2011 |
| JP | 2011134001 A | 7/2011 |
| JP | 2011197776 A | 10/2011 |
| JP | 2011233082 A | 11/2011 |
| JP | 2012133068 A | 7/2012 |
| JP | 20120221072 A | 11/2012 |
| JP | 2013508824 A | 3/2013 |
| KR | 20050104382 A | 11/2005 |
| KR | 20120080210 A | 7/2012 |
| WO | 2004075169 A2 | 9/2004 |
| WO | 2011047338 A1 | 4/2011 |

OTHER PUBLICATIONS

Foreign Communication Form A Counterpart Application, Korean Application No. 10-2014-0193129, English Translation of Korean Office Action dated May 18, 2016, 4 pages.
Partial English Translation and Abstract of Chinese Patent Application No. CN101674364A, Mar. 17, 2015, 18 pages.
Partial English Translation and Abstract of Japanese Patent Application No. JPA2003271118, Apr. 6, 2016, 27 pages.
Partial English Translation and Abstract of Japanese Patent Application No. JPA2010250465, Apr. 6, 2016, 46 pages.
Partial English Translation and Abstract of Japanese Patent Application No. JPA2011048610, Apr. 6, 2016, 29 pages.
Partial English Translation and Abstract of Japanese Patent Application No. JPA2011134001, Apr. 6, 2016, 38 pages.
Partial English Translation and Abstract of Japanese Patent Application No. JPA2011197776, Apr. 6, 2016, 49 pages.
Partial English Translation and Abstract of Japanese Patent Application No. JPA2011233082, Apr. 6, 2016, 77 pages.
Partial English Translation and Abstract of Japanese Patent Application No. JPA2012133068, Apr. 6, 2016, 39 pages.
Partial English Translation and Abstract of Japanese Patent Application No. JPA2012221072, Apr. 6, 2016, 66 pages.
Partial English Translation and Abstract of Japanese Patent Application No. JPA2013508824, Apr. 6, 2016, 32 pages.
Partial English Translation and Abstract of Japanese Patent Application No. JPH09138730, Apr. 6, 2016, 31 pages.
Foreign Communication From a Counterpart Application, Japanese Application No. 2014-264604, Japanese Office Action dated Feb. 2, 2016, 4 pages.
Foreign Communication From a Counterpart Application, Japanese Application No. 2014-264604, English Translation of Japanese Office Action dated Feb. 2, 2016, 5 pages.
Foreign Communication From a Counterpart Application, Korean Application No. 10-2014-0193129, Korean Office Action dated Nov. 16, 2015, 5 pages.
Foreign Communication From a Counterpart Application, Korean Application No. 10-2014-0193129, Korean Office Action dated Nov. 16, 2015, 4 pages.
Foreign Communication From a Counterpart Application, European Application No. 14197587.0, Extended European Search Report dated Jul. 7, 2015, 8 pages.
Machine Translation and Abstract of Chinese Publication No. CN101930333, Dec. 29, 2010, 11 pages.
Machine Translation and Abstract of Chinese Publication No. CN102739696, Oct. 17, 2012, 13 pages.
Machine Translation and Abstract of Chinese Publication No. CN103218105, Jul. 24, 2013, 20 pages.
Foreign Communication From a Counterpart Application, European Application No. 14197587.0, European Office Action dated Sep. 21, 2017, 9 pages.

* cited by examiner

METHOD, DEVICE, AND SYSTEM FOR RECOGNIZING GESTURE BASED ON MULTI-TERMINAL COLLABORATION

CROSS-REFERENCE TO RELATED APPLICATION

This application claims priority to Chinese Patent Application No. 201310746679.4, filed on Dec. 30, 2013, which is hereby incorporated by reference in its entirety.

TECHNICAL FIELD

The present invention relates to the field of intelligent terminal technologies, and in particular, to a method, a device, and a system for recognizing a gesture based on multi-terminal collaboration.

BACKGROUND

At present, after intelligent terminals become popular, a new trend appears, that is, multiple intelligent terminals are paired to work collaboratively. For example, multiple intelligent terminals are used to collaboratively display a picture, or multiple intelligent terminals are used to create a surround stereo effect. In an application scenario in which multiple terminals work collaboratively, there exists a requirement of performing a gesture operation across terminals.

In the prior art, gesture operation and recognition across screens may be implemented by relying on touch screens when two terminals are spliced. However, in a scenario in which more than two terminals work collaboratively, performing a gesture operation by relying on touch screens has significant limitations with relatively low operation efficiency. As a result, the method for performing gesture recognition by relying on touch screens in the prior art cannot be efficiently applied in a work scenario in which more than two terminals collaborate. Therefore, at present, there lacks an efficient method for implementing gesture recognition based on multi-terminal collaboration.

SUMMARY

In view of this, a primary objective of the present invention is to provide a method, a device, and a system for recognizing a gesture based on multi-terminal collaboration, so as to solve a problem that it is difficult to implement gesture recognition in multi-terminal collaboration in the prior art.

To solve the foregoing problem, the present invention provides the following technical solutions.

According to a first aspect, the present invention provides a method for recognizing a gesture based on multi-terminal collaboration, where the method includes receiving, by a first terminal after receiving a collaboration request activation signal triggered by a user, parameter information of second terminals sent by the second terminals; recording, by the first terminal according to the parameter information of the second terminals, an arrangement manner of terminals that participate in acquiring of gesture information, where the terminals that participate in the acquiring of the gesture information include all terminals or the second terminals, and all the terminals include the first terminal and the second terminals; receiving, by the first terminal, sensor trigger information sent by at least one second terminal; and determining, by the first terminal according to the recorded arrangement manner and the acquired sensor trigger information, a type of a gesture that triggers a sensor.

In a first implementation manner of the first aspect, the parameter information includes a device configuration parameter, and the recording, by the first terminal according to the received parameter information of the second terminals, an arrangement manner of terminals that participate in acquiring of gesture information includes displaying, in an interface by the first terminal according to a device configuration parameter of the first terminal, received device configuration parameters of the second terminals, and the number of all the terminals, at least one arrangement manner containing all the terminals, for the user to select, and recording an arrangement manner selected by the user.

In a second implementation manner of the first aspect, the parameter information includes a device configuration parameter, and the recording, by the first terminal according to the received parameter information of the second terminals, an arrangement manner of terminals that participate in acquiring of gesture information includes displaying, in an interface by the first terminal according to received device configuration parameters of the second terminals and the number of the second terminals, at least one arrangement manner containing the second terminals, for the user to select, and recording an arrangement manner selected by the user.

With reference to the first aspect or the first implementation manner of the first aspect or the second implementation manner of the first aspect, in a third implementation manner of the first aspect, the determining, by the first terminal according to the recorded arrangement manner and the acquired sensor trigger information, a type of a gesture that triggers a sensor includes acquiring, by the first terminal, first sensor trigger information of each triggered terminal from at least one piece of sensor trigger information detected by each triggered terminal, where the first sensor trigger information is provided by a sensor of a highest priority of each terminal; determining, by the first terminal, a sliding direction of the gesture and calculating a trigger time difference between adjacent triggered terminals along the sliding direction of the gesture according to the recorded arrangement manner and trigger time that is contained in the first sensor trigger information of each triggered terminal; and determining, by the first terminal according to the sliding direction of the gesture and the trigger time difference, the type of the gesture that triggers the sensor.

With reference to the third implementation manner of the first aspect, in a fourth implementation manner of the first aspect, before the determining, by the first terminal, a sliding direction of the gesture and calculating a trigger time difference between adjacent triggered terminals along the sliding direction of the gesture according to the recorded arrangement manner and trigger time that is contained in the first sensor trigger information of each triggered terminal, the method further includes determining that time of the first terminal is synchronized with time of the second terminal.

With reference to the third implementation manner of the first aspect or the fourth implementation manner of the first aspect, in a fifth implementation manner of the first aspect, the determining, by the first terminal according to the sliding direction of the gesture and the trigger time difference, the type of the gesture that triggers the sensor includes determining that the type of the gesture that triggers the sensor is slide gesture, when the gesture slides in a unidirectional manner and the first terminal determines that the trigger time difference is within a preset time range; determining that the type of the gesture that triggers the sensor is zoom-in gesture, when the gesture includes a first gesture and a second gesture, the first gesture and the second gesture slide apart from each other, and both the first gesture and the second gesture are slide gestures; and determining that the type of the gesture that triggers the sensor is zoom-out gesture, when the first gesture and the second gesture slide toward each other and both the first gesture and the second gesture are slide gestures; and determining that the type of the gesture that triggers the sensor is rotate gesture, when a sliding direction of the first gesture is different from a sliding direction of the second gesture, a start terminal of the first gesture is different from a start terminal of the second gesture, an end terminal of the first gesture is different from an end terminal of the second gesture, and the first terminal determines that both the first gesture and the second gesture are slide gestures and a difference between trigger time of the end terminal of the first gesture and that of the end terminal of the second gesture is less than a preset threshold.

According to a second aspect, the present invention provides a method for recognizing a gesture based on multi-terminal collaboration, where the method includes sending, by a second terminal after receiving a collaboration request activation signal, parameter information of the second terminal to a first terminal, so that the first terminal records, according to parameter information of second terminals, an arrangement manner of terminals that participate in acquiring of gesture information, where the terminals that participate in the acquiring of the gesture information include all terminals or the second terminals, and all the terminals include the first terminal and the second terminals; and sending, by the second terminal when detecting that a sensor is triggered, detected sensor trigger information to the first terminal, so that the first terminal determines, according to the recorded arrangement manner and the acquired sensor trigger information, a type of a gesture that triggers the sensor.

In a first implementation manner of the second aspect, the parameter information includes a device configuration parameter, and the sending, by a second terminal, parameter information to the first terminal includes sending, by the second terminal, the device configuration parameter to the first terminal, so that the first terminal displays, in an interface according to a device configuration parameter of the first terminal, received device configuration parameters of the second terminals, and the number of all the terminals, at least one arrangement manner containing all the terminals, for a user to select, and records an arrangement manner selected by the user.

In a second implementation manner of the second aspect, the parameter information includes a device configuration parameter, and the sending, by a second terminal, parameter information to the first terminal includes sending, by the second terminal, the device configuration parameter to the first terminal, so that the first terminal displays, in an interface according to received device configuration parameters of the second terminals and the number of the second terminals, at least one arrangement manner containing the second terminals, for a user to select, and records an arrangement manner selected by the user.

According to a third aspect, the present invention provides a terminal, where the terminal includes a receiver, a recording unit, and a determining unit, where the receiver is configured to receive a collaboration request activation signal triggered by a user; the receiver is further configured to receive parameter information of terminals sent by the terminals; the recording unit is configured to record, according to the parameter information received by the receiver, an arrangement manner of terminals that participate in acquiring of gesture information, where the terminals that participate in the acquiring of the gesture information includes all terminals or the terminals, and all the terminals include the terminal itself and the terminals; the receiver is further configured to receive sensor trigger information sent by at least one terminal; and the determining unit is configured to determine, according to the arrangement manner recorded by the recording unit and the sensor trigger information received by the receiver, a type of a gesture that triggers a sensor.

In a first implementation manner of the third aspect, the parameter information includes a device configuration parameter, and the recording unit includes a first calculating subunit configured to calculate and display at least one arrangement manner of all the terminals according to a device configuration parameter of the terminal itself, device configuration parameters of the terminals received by the receiver, and the number of all the terminals; and a first recording subunit configured to record an arrangement manner selected by the user according to the display of the first calculating subunit.

In a second implementation manner of the third aspect, the parameter information includes a device configuration parameter, and the recording unit includes a second calculating subunit configured to calculate and display at least one arrangement manner of the terminals, according to device configuration parameters of the terminals received by the receiver and the number of terminals that send the device configuration parameters; and a second recording subunit configured to record an arrangement manner selected by the user according to the display of the second calculating subunit.

With reference to the third aspect or the first implementation manner of the third aspect or the second implementation manner of the third aspect, in a third implementation manner of the third aspect, the determining unit includes an information determining subunit configured to acquire first sensor trigger information of each triggered terminal from at least one piece of sensor trigger information detected by each triggered terminal, where the first sensor trigger information is provided by a sensor of a highest priority of each terminal; a third calculating subunit configured to determine a sliding direction of the gesture and calculate a trigger time difference between adjacent triggered terminals along the sliding direction of the gesture according to the arrangement manner recorded by the recording unit and trigger time that is contained in the first sensor trigger information of each triggered terminal, where the first sensor trigger information of each triggered terminal is determined by the information determining subunit; and a gesture determining subunit configured to determine, according to the sliding direction of the gesture and the trigger time difference that are determined by the third calculating subunit, the type of the gesture that triggers the sensor, where the type of the gesture includes slide gesture, zoom gesture, and rotate gesture.

With reference to the third implementation manner of the third aspect, in a fourth implementation manner of the third aspect, a time determining unit is further included. The time determining unit is configured to determine that time of the terminal itself is synchronized with time of the terminals; and the third calculating subunit is configured to, when the time determining unit determines that time is synchronized, determine the sliding direction of the gesture and calculate the trigger time difference between adjacent triggered terminals along the sliding direction of the gesture according to the arrangement manner recorded by the recording unit and the trigger time that is contained in the first sensor trigger information of each triggered terminal, where the first sensor trigger information of each triggered terminal is determined by the information determining subunit.

With reference to the third implementation manner of the third aspect or the fourth implementation manner of the third aspect, in a fifth implementation manner of the third aspect, the gesture determining subunit is configured to determine that the type of the gesture that triggers the sensor is slide gesture, when the gesture slides in a unidirectional manner and determine that the trigger time difference is within a preset time range; determine that the type of the gesture that triggers the sensor is zoom-in gesture, when the gesture includes a first gesture and a second gesture, the first gesture and the second gesture slide apart from each other, and both the first gesture and the second gesture are slide gestures; and determine that the type of the gesture that triggers the sensor is zoom-out gesture, when the first gesture and the second gesture slide toward each other, and both the first gesture and the second gesture are slide gestures; and determine that the type of the gesture that triggers the sensor is rotate gesture, when a sliding direction of the first gesture is different from a sliding direction of the second gesture, a start terminal of the first gesture is different from a start terminal of the second gesture, an end terminal of the first gesture is different from an end terminal of the second gesture, and determine that both the first gesture and the second gesture are slide gestures and a difference between trigger time of the end terminal of the first gesture and that of the end terminal of the second gesture is less than a preset threshold.

According to a fourth aspect, the present invention provides a terminal, where the terminal includes a receiver configured to receive a collaboration request activation signal; and a transmitter configured to send parameter information to a receiving terminal when the receiver receives the collaboration request activation signal, so that the receiving terminal records, according to the received parameter information, an arrangement manner of terminals that participate in acquiring of gesture information, where the terminals that participate in the acquiring of the gesture information includes all terminals or terminals sending parameter information, and all the terminals include the terminals sending parameter information and the receiving terminal; and the transmitter is further configured to send detected sensor trigger information to the receiving terminal when it is detected that a sensor is triggered, so that the receiving terminal determines, according to the recorded arrangement manner and the acquired sensor trigger information, a type of a gesture that triggers the sensor.

In a first implementation manner of the fourth aspect, the transmitter is configured to send a device configuration parameter to the receiving terminal, so that the receiving terminal displays, in an interface according to a device configuration parameter of the terminal itself, received device configuration parameters of terminals, and the number of all the terminals, at least one arrangement manner containing all the terminals, for a user to select, and records an arrangement manner selected by the user.

In a second implementation manner of the fourth aspect, the transmitter is configured to send a device configuration parameter to the receiving terminal, so that the receiving terminal displays, in an interface according to received device configuration parameters of terminals and the number of terminals sending device configuration parameters, at least one arrangement manner containing the terminals sending device configuration parameters, for a user to select, and records an arrangement manner selected by the user.

According to a fifth aspect, the present invention provides a system for recognizing a gesture based on multi-terminal collaboration, where the system includes a first terminal and at least one second terminal; the first terminal is the terminal provided by the third aspect of the present invention; and the second terminal is the terminal provided by the fourth aspect of the present invention.

As can be learned from the above, the present invention has the following beneficial effects.

In the embodiments of the present invention, an air gesture of a user can be recognized. An air gesture operation saves an operation time of the user, improves operation efficiency, and can be efficiently applied in a work scenario in which more than two terminals collaborate. The embodiments of the present invention provide a simple and efficient manner to recognize a type of a gesture in multi-terminal collaboration, with high recognition efficiency by using the following technical solution. After a first terminal records an arrangement manner of terminals that participate in acquiring of gesture information and when a user makes an air gesture to trigger a sensor of each terminal, the first terminal can determine, according to sensor trigger information detected by each triggered terminal, a type of the gesture that triggers the sensor.

DESCRIPTION OF EMBODIMENTS

To make persons skilled in the art understand the technical solutions in the present invention better, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

A method, a device, and a system for recognizing a gesture in multi-terminal collaboration that are provided in the embodiments of the present invention may be applied in a multi-terminal collaboration scenario. Multi-terminal collaboration means that multiple terminal devices can perform various operations in a pairing manner. In the prior art, there lacks a method for recognizing a gesture for multi-terminal collaboration. Therefore, the embodiments of the present invention provide the following method, device, and system for recognizing a gesture in multi-terminal collaboration.

Figure 1:
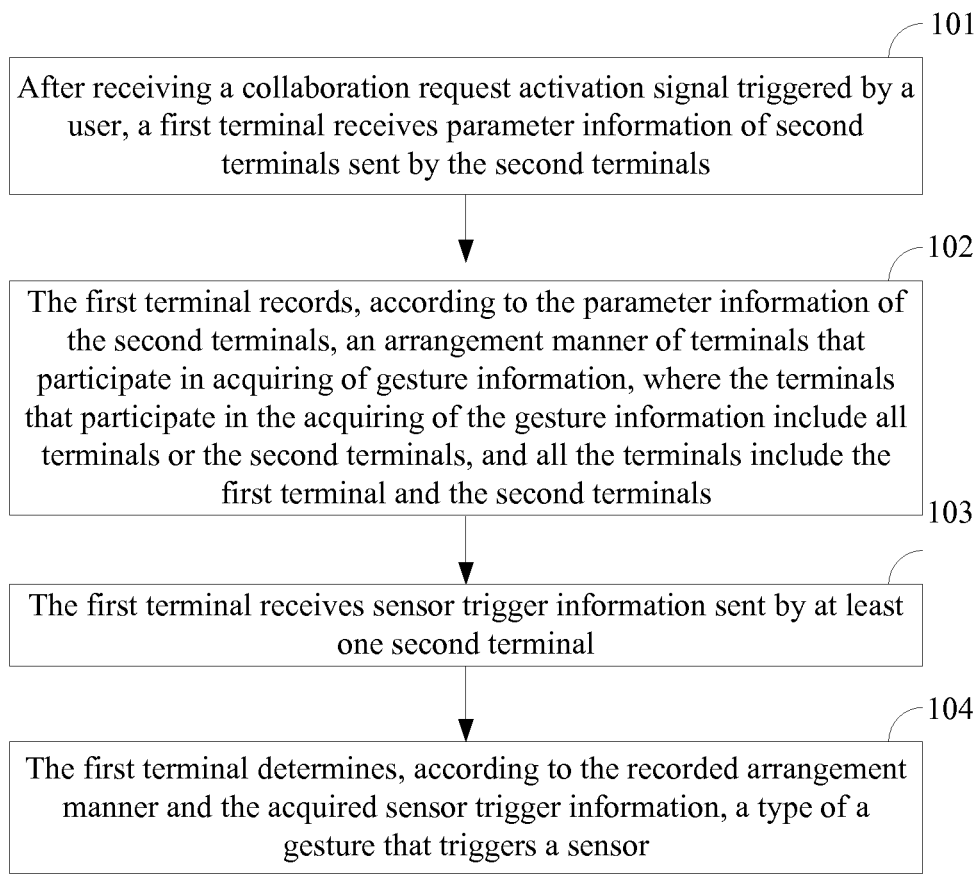
FIG. 1 is a flowchart of Embodiment 1 of a method for recognizing a gesture in multi-terminal collaboration in embodiments of the present invention.

As shown in FIG. 1, Embodiment 1 of the method for recognizing a gesture in multi-terminal collaboration in the embodiments of the present invention may include the following steps, where this embodiment is described by assuming that a first terminal is an execution body.

Step 101: After receiving a collaboration request activation signal triggered by a user, the first terminal receives parameter information of second terminals sent by the second terminals.

After receiving the collaboration request activation signal triggered by the user, the first terminal first establishes connections to the second terminals in a wireless connection manner. A collaboration function needs to be activated for each terminal that needs to participate in collaboration. For example, the collaboration request activation signal may be triggered by means of enabling a dedicated application (app) by the user. After receiving the collaboration request activation signal triggered by the user, the first terminal establishes connections to the second terminals in a wireless connection manner. For another example, after receiving the collaboration request activation signal triggered by the user, the first terminal sends a collaboration request activation signal to other terminals, where a distance between the other terminals and the first terminal is within a preset distance range, so that a second terminal receiving the collaboration request activation signal establishes a connection to each second terminal in the wireless connection manner.

The wireless connection manner may be multiple manners, including but not limited to Wireless Fidelity (WiFi), Miracast, the third generation mobile telecommunications technologies (3G), BLUETOOTH, and the like. WiFi is a type of wireless compatibility certification and a technology that is capable of connecting terminals such as a personal computer and a handheld device in a wireless manner. Miracast is a wireless standard based on WiFi direct (WiFi Direct) in a certification program established by the WiFi Alliance.

In this embodiment, a terminal meeting a preset condition among all terminals may be determined as the first terminal, and other terminals are determined as the second terminals. That is, the first terminal is a terminal meeting the preset condition among all the terminals. The first terminal may be understood as a primary terminal, and the second terminal may be understood as a secondary terminal. For example, a terminal that enables an app first is determined as the first terminal, or a terminal whose processor has a highest dominant frequency is determined as the first terminal. The first terminal, that is, the primary terminal, serves as a primary device of interaction and may receive operation information of the user, receive information sent by the second terminals, and implement gesture recognition in multi-terminal collaboration. The second terminal, that is, the secondary terminal, may send information such as a device configuration parameter and detected sensor trigger information to the first terminal, so that the first terminal implements the gesture recognition in multi-terminal collaboration.

Step 102: The first terminal records, according to the parameter information of the second terminals, an arrangement manner of terminals that participate in acquiring of gesture information, where the terminals that participate in the acquiring of the gesture information include all terminals or the second terminals, and all the terminals include the first terminal and the second terminals.

The terminals that participate in the acquiring of the gesture information may be multiple second terminals and may also be the first terminal and multiple second terminals.

Figure 2:
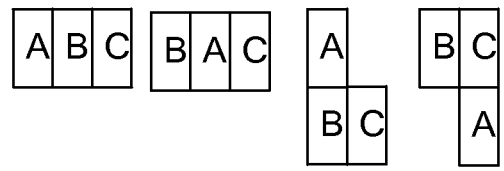
FIG. 2 is a schematic diagram of a terminal arrangement manner according to an embodiment of the present invention.

The arrangement manner of the terminals that participate in the acquiring of the gesture information includes an arrangement shape, an arrangement sequence, and a relative arrangement position. As shown in FIG. 2, three terminals are used as an example. The arrangement shape of the terminals may be a line, an L shape, an inverted L shape, or the like; the arrangement sequence refers to an arrangement sequence such as up/down/left/right relationship, and the arrangement sequence may be that terminal A, terminal B, and terminal C are arranged sequentially, may also be that terminal B, terminal A, and terminal C are arranged sequentially, or the like; the relative arrangement position refers to a specific positional relationship such as a distance between the terminals.

In some embodiments of the present invention, the parameter information includes a device configuration parameter, and a specific implementation manner of the recording, by the first terminal according to the received parameter information of the second terminals, an arrangement manner of terminals that participate in acquiring of the gesture information includes: displaying, in an interface by the first terminal according to a device configuration parameter of the first terminal, received device configuration parameters of the second terminals, and the number of all the terminals, at least one arrangement manner containing all the terminals, for the user to select, and recording an arrangement manner selected by the user.

When the terminals that participate in the acquiring of the gesture information are the first terminal and the multiple second terminals, each of the second terminals may send a device configuration parameter, for example, a terminal screen size parameter and a screen resolution, to the first terminal. The first terminal may calculate multiple possible arrangement manners of all the terminals according to the device configuration parameter of the first terminal, device configuration parameters of the second terminals, and the number of all the terminals, and display the multiple arrangement manners of all the terminals in a visual manner for the user to select. When the number of the terminals is relatively small, all arrangement manners may be displayed, and when the number of the terminals is relatively large, a preferred arrangement manner may be displayed. After the user selects an arrangement manner, the first terminal may record the arrangement manner selected by the user.

In some embodiments of the present invention, the parameter information includes a device configuration parameter, and the recording, by the first terminal according to the received parameter information of the second terminals, an arrangement manner of terminals that participate in acquiring of the gesture information includes displaying, in an interface by the first terminal according to received device configuration parameters of the second terminals and the number of second terminals, at least one arrangement manner containing the second terminals, for the user to select, and recording an arrangement manner selected by the user.

When the terminals that participate in the acquiring of the gesture information are only the multiple second terminals, each of the second terminals may send a device configuration parameter, for example, a terminal screen size parameter and a screen resolution, to the first terminal. The first terminal may calculate possible arrangement manners of all the second terminals according to device configuration parameters of the second terminals and the number of the second terminals, and display multiple arrangement manners of the second terminals in a visual manner for the user to select. When the number of the terminals is relatively small, all arrangement manners may be displayed, and when the number of the terminals is relatively large, a preferred arrangement manner may be displayed. After the user selects an arrangement manner, the first terminal may record the arrangement manner selected by the user.

In addition, in some embodiments of the present invention, a specific implementation manner of the recording, by the first terminal according to the parameter information of the second terminal, an arrangement manner of terminals that participate in acquiring of the gesture information may also include calculating, by the first terminal according to received position parameters of the second terminals, a current arrangement manner of the terminals that participate in the acquiring of the gesture information, and recording the current arrangement manner of the terminals that participate in the acquiring of the gesture information.

In this manner, the first terminal does not need to calculate and display multiple arrangement manners of the terminals according to device configuration parameters of the second terminals and the number of the terminals. Instead, after the user completes terminal arrangement, position parameters are sent to the first terminal by means of ultrasonic signals or other signals transmitted by the terminals to each other. The first terminal calculates the current arrangement manner of the terminals that participate in the acquiring of the gesture information, and records the current arrangement manner of the terminals that participate in the acquiring of the gesture information.

Step 103: The first terminal receives sensor trigger information sent by at least one second terminal.

A terminal may carry various different sensors, and the sensors are triggered when the user makes an air gesture to slide across the terminal. The sensors may include but is not limited to an infrared sensor, a light sensor, a terminal capacitive screen, an ultrasonic detector, or an image sensor.

Figure 3:
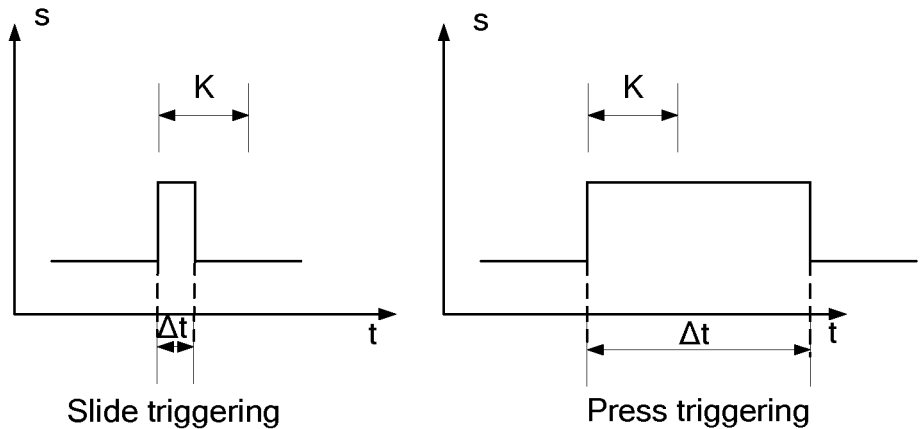
FIG. 3 is a schematic diagram of a trigger manner according to an embodiment of the present invention.

At present, sensors integrated to various terminals are essentially switch-type sensors. Some sensors further have a capability of detecting several discrete states. Therefore, a trigger manner may be classified into slide triggering or press triggering. As shown in FIG. 3, the trigger manner is determined mainly by relying on a change time $\Delta t$ of a sensor state S. If $\Delta t$ is greater than a time constant K, the trigger manner may be considered to be press triggering, and if $\Delta t$ is less than the time constant K, the trigger manner is slide triggering. The time constant K may be determined by relying on an empirical value and may be 1-3 seconds typically.

The first terminal and the second terminals may detect a change of the sensor signals, and the terminals that participate in the acquiring of the gesture information send detected sensor trigger information to the first terminal. It should be noted that multiple types of sensors may be triggered when a gesture slides across a terminal, and in this case, trigger information of the multiple types of sensors is sent to the first terminal together. In some embodiments of the present invention, the sensor trigger information may include but is not limited to trigger time, a trigger manner, and a sensor triggering type. Information about the sensor triggering type may include but is not limited to one or a combination of infrared triggering, light triggering, and image triggering. If the trigger manner is press triggering, the trigger time may be boundary time when the triggering starts or ends.

Step 104: The first terminal determines, according to the recorded arrangement manner and the acquired sensor trigger information, a type of a gesture that triggers a sensor.

On a premise that the arrangement manner is determined, that is, the arrangement shape, the arrangement sequence, and relative arrangement positions of the terminals are known, the type of the gesture that triggers the sensor may be obtained according to the sensor trigger information, where the type of the gesture includes but is not limited to slide gesture, zoom gesture, and rotate gesture.

In this embodiment, an air gesture of a user can be recognized. An air gesture operation saves an operation time of the user, improves operation efficiency, and can be efficiently applied in a work scenario in which more than two terminals collaborate. This embodiment of the present invention provides a simple and efficient manner to recognize a type of a gesture in multi-terminal collaboration, with high recognition efficiency by using the following technical solution. After a first terminal records an arrangement manner of terminals that participate in acquiring of gesture information and when a user makes an air gesture to trigger a sensor of each terminal, the first terminal can determine, according to sensor trigger information detected by each triggered terminal, a type of the gesture that triggers the sensor.

Figure 4:
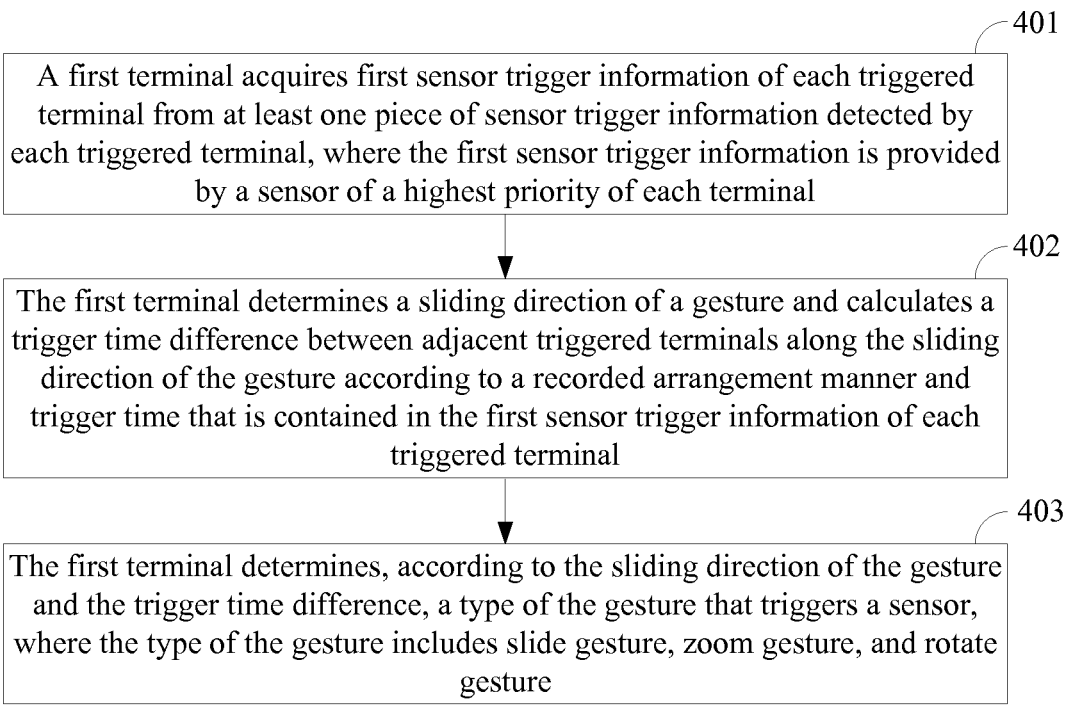
FIG. 4 is a flowchart of Embodiment 2 of the method for recognizing a gesture in multi-terminal collaboration in the embodiments of the present invention.

As shown in FIG. 4, Embodiment 2 of the method for recognizing a gesture in multi-terminal collaboration in the embodiments of the present invention may include the following steps. This embodiment mainly describes a specific implementation manner of determining, by a first terminal according to a recorded arrangement manner and acquired sensor trigger information, a type of a gesture that triggers a sensor.

Step 401: The first terminal acquires first sensor trigger information of each triggered terminal from at least one piece of sensor trigger information detected by each triggered terminal, where the first sensor trigger information is provided by a sensor of a highest priority of each terminal.

In this embodiment, the first terminal screens received sensor trigger information, and one piece of sensor trigger information that is the most significant, that is, the first sensor trigger information, is reserved for each triggered terminal. For example, a sensor priority may be set, and an infrared sensor among multiple sensors of a terminal serves as the sensor of the highest priority, and sensor trigger information provided by the infrared sensor serves as the first sensor trigger information of the terminal. When the infrared sensor of the terminal is abnormal, sensor trigger information provided by a light sensor may serve as the first sensor trigger information. In this way, the first terminal acquires the first sensor trigger information of each triggered terminal from the at least one piece of sensor trigger information detected by each triggered terminal, where the first sensor trigger information is provided by the sensor of the highest priority of each terminal.

Step 402: The first terminal determines a sliding direction of the gesture and calculates a trigger time difference between adjacent triggered terminals along the sliding direction of the gesture according to the recorded arrangement manner and trigger time that is contained in the first sensor trigger information of each triggered terminal.

With reference to the recorded arrangement manner and a trigger time information sequence in sensor trigger information of each terminal, the sliding direction of the gesture may be determined, a trigger information time difference of adjacent triggered terminals along the sliding direction of the gesture is then calculated, and the type of the gesture that triggers the sensor may be obtained further.

In some embodiments of the present invention, before the determining, by the first terminal, the sliding direction of the gesture and calculating the trigger time difference between adjacent triggered terminals along the sliding direction of the gesture according to the recorded arrangement manner and the trigger time that is contained in the first sensor trigger information of each triggered terminal, the following may be further included: determining that time of the first terminal is synchronized with time of a second terminal.

In a practical application, after the first terminal establishes a connection to a second terminal, time synchronization for the first terminal and the second terminal may be performed based on the time of the first terminal. When both the first terminal and the second terminal are capable of connecting to a network, the time synchronization for the first terminal and the second terminal may also be performed based on standard time.

Step 403: The first terminal determines, according to the sliding direction of the gesture and the trigger time difference, the type of the gesture that triggers the sensor, where the type of the gesture includes slide gesture, zoom gesture, and rotate gesture.

A specific implementation manner of the determining, by the first terminal according to the sliding direction of the gesture and the trigger time difference, the type of the gesture that triggers the sensor is described by assuming that the type of the gesture is determined as slide gesture, zoom gesture, or rotate gesture.

1. Recognition of a Slide Gesture.

In some embodiments of the present invention, specific implementation of the determining, by the first terminal according to the sliding direction of the gesture and the trigger time difference, the type of the gesture that triggers the sensor may include determining that the type of the gesture that triggers the sensor is a slide gesture, when the sliding direction of the gesture is unidirectional sliding and the first terminal determines that the trigger time difference is within a preset time range.

Figure 5:
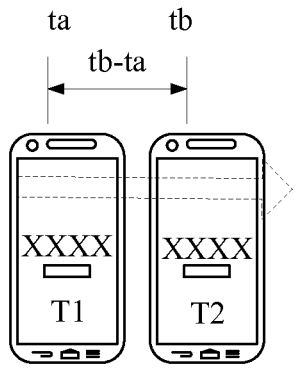
FIG. 5 is a schematic diagram of a slide gesture according to an embodiment of the present invention.

As shown in FIG. 5, the recognition of a slide gesture is described by assuming that two terminals collaborate. When trigger time in sensor trigger information of terminal T1 is ta, that is, terminal T1 is triggered at the moment ta, trigger time in sensor trigger information of terminal T2 is tb, that is, terminal T2 is triggered at the moment tb, and the trigger time tb is later than the trigger time ta, it indicates that the sliding direction of the gesture is unidirectional sliding from terminal T1 to terminal T2. If a trigger manner of a terminal is press triggering, trigger time is boundary time. In this embodiment, if the trigger manner of terminal T1 is press triggering, ta is a moment at which the gesture leaves T1, and if the trigger manner of terminal T2 is press triggering, tb is the first moment at which the gesture triggers the sensor.

Figure 6:
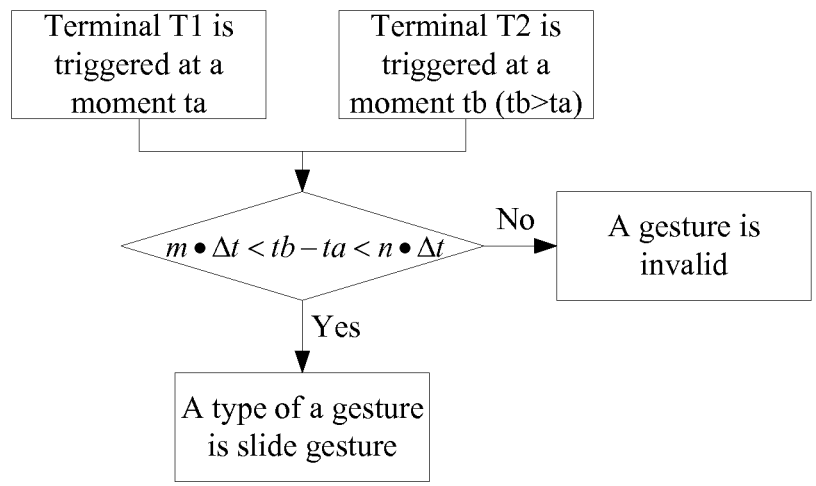
FIG. 6 is a schematic diagram of a process of recognizing a slide gesture according to an embodiment of the present invention.

As shown in FIG. 6, the first terminal calculates a trigger time difference tb-ta according to the trigger time ta of terminal T1 and the trigger time tb of terminal T2 and determines whether the trigger time difference tb-ta is within the preset time range, that is, determines whether $m \cdot \Delta t < tb - ta < n \cdot \Delta t$ holds true, where $\Delta t$ is a system parameter and may describe a standard time difference of sliding of an object across two terminals. In a practical operation, this parameter may use an empirical value or be obtained by using an experimental test. However, a time of each operation of a user is inconstant, and therefore constants m and n ($m<1<n$) are introduced to provide some redundancy for state determining. When the sliding direction of the gesture is the unidirectional sliding from terminal T1 to terminal T2 and $m \cdot \Delta t < tb - ta < n \cdot \Delta t$ holds true, that is, the trigger time difference tb-ta is within the preset time range, the type of the gesture that triggers the sensor is slide gesture.

It should be noted that determining of a slide gesture in multi-terminal collaboration is similar to the dual-terminal situation in this embodiment. In both situations, the determining may be performed in the following manner. Determine that the type of the gesture that triggers the sensor is a slide gesture, when the sliding direction of the gesture is determined as unidirectional sliding and the first terminal determines that the trigger time difference is within the preset time range.

2. Recognition of a Zoom Gesture.

In some embodiments of the present invention, specific implementation of the determining, by the first terminal according to the sliding direction of the gesture and the trigger time difference, the type of the gesture that triggers the sensor may include determining that the type of the gesture that triggers the sensor is zoom-in gesture, when the sliding direction of the gesture is that a first gesture and a second gesture slide apart from each other, and the first terminal determines that both the first gesture and the second gesture are slide gestures; and determining that the type of the gesture that triggers the sensor is a zoom-out gesture, when the sliding direction of the gesture is that a first gesture and a second gesture slide toward each other, and the first terminal determines that both the first gesture and the second gesture are slide gestures.

Figure 7:
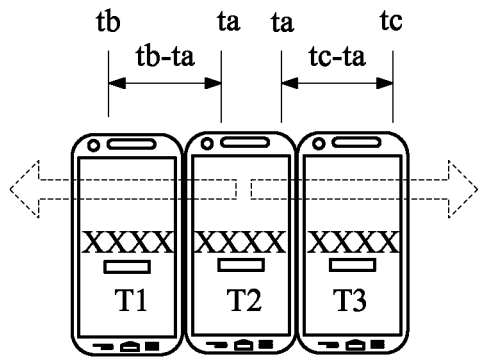
FIG. 7 is a schematic diagram of a zoom-in gesture according to an embodiment of the present invention.

As shown in FIG. 7, the recognition of a zoom-in gesture is described by assuming that three terminals collaborate. When trigger time in sensor trigger information of terminal T1 is ta, that is, terminal T1 is triggered at the moment ta, trigger time in sensor trigger information of terminal T2 is tb, that is, terminal T2 is triggered at the moment tb, and trigger time in sensor trigger information of terminal T3 is tc, that is, terminal T3 is triggered at the moment tc, where the trigger time tb is later than the trigger time ta, and the trigger time tc is also later than the trigger time ta, it indicates that the two gestures slide from terminal T2 to terminal T1 and to terminal T3 respectively. Further, the arrangement manner of the terminals is known, and in this case, it may be learned that the sliding direction of the gesture is that the first gesture and the second gesture slide apart from each other.

Figure 8:
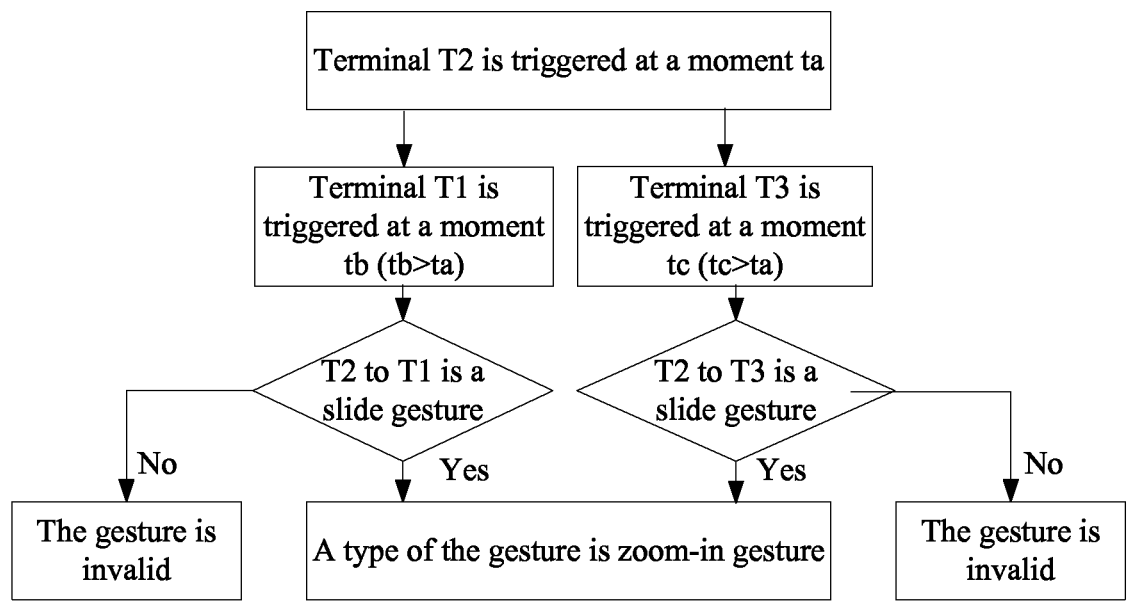
FIG. 8 is a schematic diagram of a process of recognizing a zoom-in gesture according to an embodiment of the present invention.

As shown in FIG. 8, after the sliding direction of the gesture is determined and when both the first gesture and the second gesture are slide gestures, it may be further learned that the type of the gesture that triggers the sensor is a zoom-in gesture.

It should be noted that determining of a zoom-in gesture in multi-terminal collaboration is similar to the three-terminal situation in this embodiment. In both situations, the determining may be performed in the following manner. Determine that the type of the gesture that triggers the sensor is a zoom-in gesture, when the sliding manner of the gesture is that the first gesture and the second gesture slide apart from each other, and the first terminal determines that both the first gesture and the second gesture are slide gestures.

Figure 9:
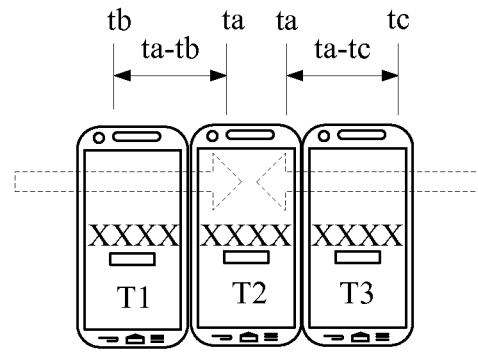
FIG. 9 is a schematic diagram of a zoom-out gesture according to an embodiment of the present invention.

As shown in FIG. 9, the recognition of a zoom-out gesture is described by assuming that three terminals collaborate. When trigger time in sensor trigger information of terminal T1 is tb, that is, terminal T1 is triggered at the moment tb, trigger time in sensor trigger information of terminal T3 is tc, that is, terminal T3 is triggered at the moment tc, and trigger time in sensor trigger information of terminal T2 is ta, that is, terminal T2 is triggered at the moment ta, where the trigger time ta is later than the trigger time tb and the trigger time tc, it indicates that the two gestures slide from terminal T1 and terminal T3 to terminal T2 respectively. Further, the arrangement manner of the terminals is known, and in this case, it may be learned that the sliding direction of the gesture is that the first gesture and the second gesture slide toward each other from two different terminals to one terminal.

Figure 10:
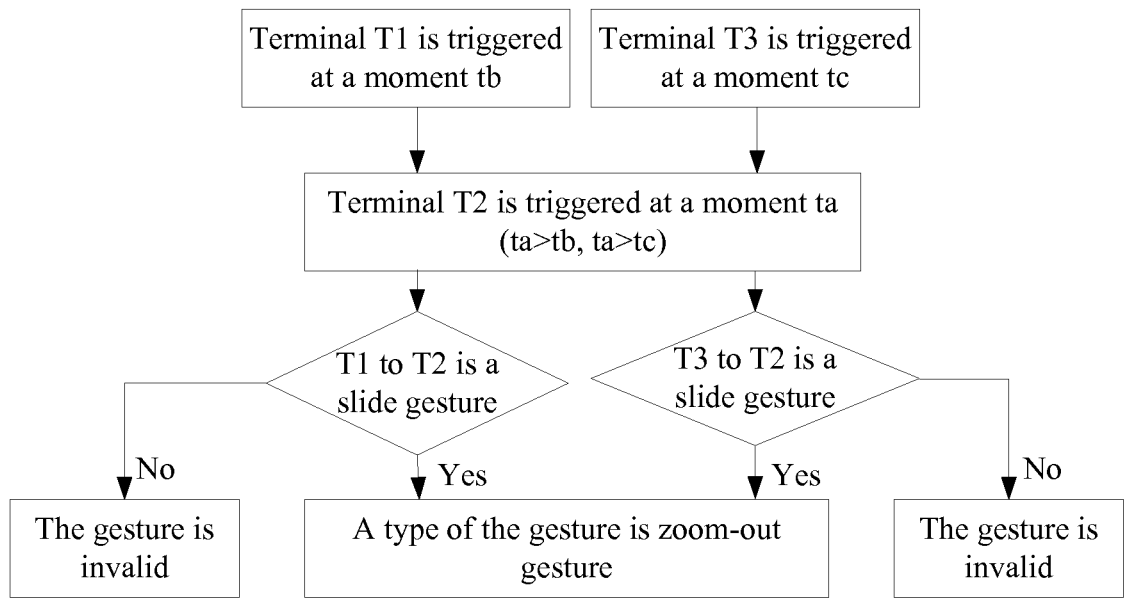
FIG. 10 is a schematic diagram of a process of recognizing a zoom-out gesture according to an embodiment of the present invention.

As shown in FIG. 10, after the sliding direction of the gesture is determined and when both the first gesture and the second gesture are slide gestures, it may be further learned that the type of the gesture that triggers the sensor is zoom-out gesture.

It should be noted that determining of a zoom-out gesture in multi-terminal collaboration is similar to the three-terminal situation in this embodiment. In both situations, the determining may be performed in the following manner: Determine that the type of the gesture that triggers the sensor is a zoom-out gesture, when the sliding manner of the gesture is that the first gesture and the second gesture slide toward each other, and the first terminal determines that both the first gesture and the second gesture are slide gestures.

3. Recognition of a Rotate Gesture.

In some embodiments of the present invention, specific implementation of the determining, by the first terminal according to the sliding direction of the gesture and the trigger time difference, the type of the gesture that triggers the sensor may include determining that the type of the gesture that triggers the sensor is a rotate gesture, when the sliding direction of the gesture is that a sliding direction of a first gesture is different from a sliding direction of a second gesture, a start terminal of the first gesture is different from a start terminal of the second gesture, an end terminal of the first gesture is different from an end terminal of the second gesture, and the first terminal determines that both the first gesture and the second gesture are slide gestures and a difference between trigger time of the end terminal of the first gesture and that of the end terminal of the second gesture is less than a preset threshold.

Figure 11:
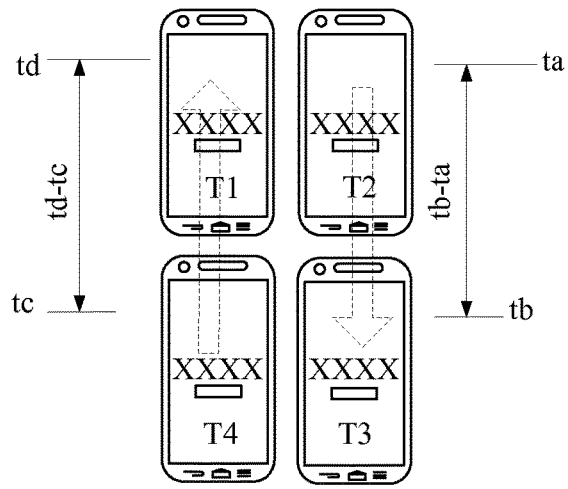
FIG. 11 is a schematic diagram of a rotate gesture according to an embodiment of the present invention.

As shown in FIG. 11, the recognition of a rotate gesture is described by assuming that four terminals collaborate. In a scenario in which four terminals collaborate, clockwise rotation may be performed by sliding from terminal T2 to terminal T3 in cooperation with sliding from terminal T4 to terminal T1. The following describes the recognition of a rotate gesture. When trigger time in sensor trigger information of terminal T2 is ta, that is, terminal T2 is triggered at the moment ta, trigger time in sensor trigger information of terminal T3 is tb, that is, terminal T3 is triggered at the moment tb, trigger time in sensor trigger information of terminal T4 is tc, that is, terminal T4 is triggered at the moment tc, and trigger time in sensor trigger information of terminal T1 is td, that is, terminal T1 is triggered at the moment td, where the trigger time tb is later than the trigger time ta, and the trigger time td is later than the trigger time tc, it indicates that the two gestures slide from terminal T2 to terminal T3 and from terminal T4 to terminal T1 respectively. Further, the arrangement manner of the terminals is known, and in this case, it may be learned that the sliding direction of the first gesture is different from the sliding direction of the second gesture, that the start terminal of the first gesture is different from the start terminal of the second gesture, and that the end terminal of the first gesture is different from the end terminal of the second gesture.

Figure 12:
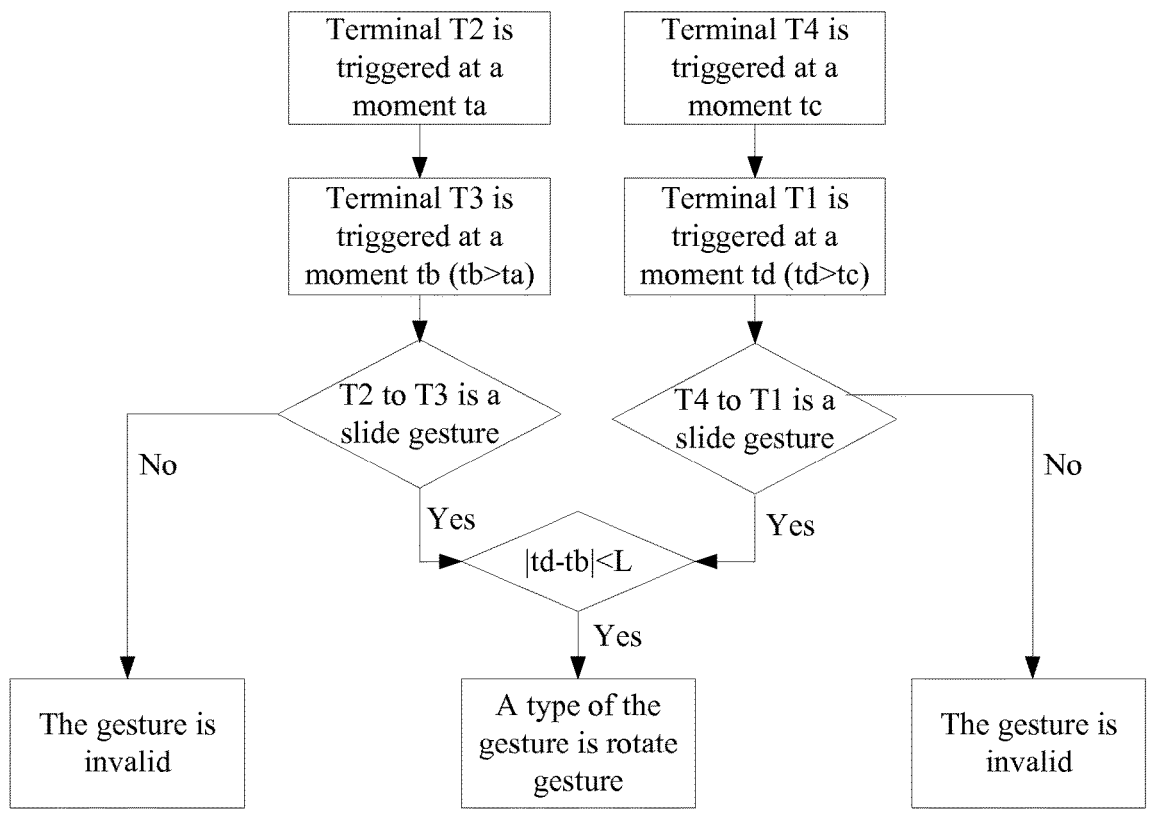
FIG. 12 is a schematic diagram of a process of recognizing a rotate gesture according to an embodiment of the present invention.

As shown in FIG. 12, after the sliding direction of the gesture is determined and when both the first gesture and the second gesture are slide gestures, it needs to further determine whether the difference between the trigger time of the end terminal of the first gesture and that of the end terminal of the second gesture is less than the preset threshold, that is, whether $|td-tb|<L$ holds true, where constant L is set for determining whether the first gesture and the second gesture are synchronous and may be set according to experience in a practical application. The type of the gesture that triggers the sensor is a rotate gesture, when the difference between the trigger time of the end terminal of the first gesture and that of the end terminal of the second gesture is less than the preset threshold.

It should be noted that multi-angle rotation may be implemented in multi-terminal collaboration, where determining of a rotate gesture is similar to the four-terminal situation in this embodiment. In both situations, the determining may be performed in the following manner. Determine that the type of the gesture that triggers the sensor is a rotate gesture, when the sliding direction of the gesture is that the sliding direction of the first gesture is different from the sliding direction of the second gesture, the start terminal of the first gesture is different from the start terminal of the second gesture, the end terminal of the first gesture is different from the end terminal of the second gesture, and the first terminal determines that both the first gesture and the second gesture are slide gestures and the difference between the trigger time of the end terminal of the first gesture and that of the end terminal of the second gesture is less than the preset threshold.

In this embodiment, a first terminal can determine a specific trigger type of a gesture according to an arrangement manner of the terminals and time when the gesture triggers the terminals, where the trigger type includes but is not limited to a slide gesture, a zoom gesture, and a rotate gesture. By relying on only a single terminal sensor, detection for recognition of these gestures cannot be performed or the detection costs a lot. Therefore, this embodiment of the present invention provides a simple and efficient manner to recognize a type of a gesture in multi-terminal collaboration, with high recognition efficiency.

Figure 13:
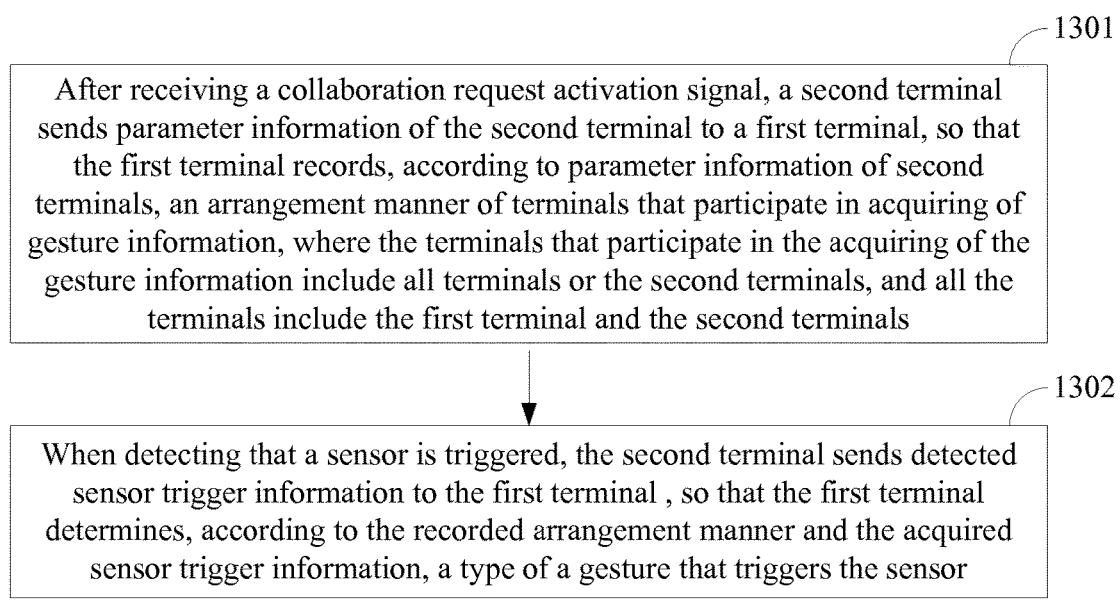
FIG. 13 is a flowchart of Embodiment 3 of the method for recognizing a gesture in multi-terminal collaboration in the embodiments of the present invention.

As shown in FIG. 13, Embodiment 4 of the method for recognizing a gesture in multi-terminal collaboration in the embodiments of the present invention may include the following steps, where this embodiment is described by assuming that a second terminal is an execution body.

Step 1301: After receiving a collaboration request activation signal, the second terminal sends parameter information of the second terminal to a first terminal, so that the first terminal records, according to parameter information of second terminals, an arrangement manner of terminals that participate in acquiring of gesture information, where the terminals that participate in the acquiring of the gesture information include all terminals or the second terminals, and all the terminals include the first terminal and the second terminals.

After receiving the collaboration request activation signal, the second terminal establishes a connection to the first terminal in a wireless connection manner. A collaboration function needs to be activated for each terminal that needs to participate in collaboration. For example, the collaboration request activation signal may be sent by means of enabling a dedicated app. After receiving the collaboration request activation signal, the second terminal establishes a connection to the first terminal in a wireless connection manner. The second terminal may also establish a connection to the first terminal in a wireless connection manner after receiving a collaboration request activation signal sent by the first terminal. The wireless connection manner may be multiple manners, including but not limited to WiFi, Miracast, 3G, BLUETOOTH, and the like.

In this embodiment, a terminal meeting a preset condition among all the terminals may be determined as the first terminal, and other terminals are determined as the second terminals. That is, the first terminal is a terminal meeting the preset condition among all the terminals. The first terminal may be understood as a primary terminal, and the second terminal may be understood as a secondary terminal. The first terminal serves as a primary device of interaction and may receive operation information of a user, receive information sent by the second terminals, and implement gesture recognition in multi-terminal collaboration. The second terminal may send information such as a device configuration parameter and detected sensor trigger information to the first terminal, so that the first terminal implements the gesture recognition in multi-terminal collaboration.

The second terminal sends the parameter information to the first terminal, so that the first terminal records, according to the parameter information of the second terminal, the arrangement manner of the terminals that participate in the acquiring of the gesture information. The terminals that participate in the acquiring of the gesture information may be multiple second terminals and may also be the first terminal and multiple second terminals. The arrangement manner of the terminals that participate in the acquiring of the gesture information includes an arrangement shape, an arrangement sequence, and a relative arrangement position.

Step 1302: When detecting that a sensor is triggered, the second terminal sends detected sensor trigger information to the first terminal, so that the first terminal determines, according to the recorded arrangement manner and the acquired sensor trigger information, a type of a gesture that triggers the sensor.

A terminal may carry various different sensors, and the sensors are triggered when the user makes an air gesture to slide across the terminal. The sensors may include but is not limited to an infrared sensor, a light sensor, a terminal capacitive screen, an ultrasonic detector, or an image sensor. At present, sensors integrated to various terminals are essentially switch-type sensors. Some sensors further have a capability of detecting several discrete states. Therefore, a trigger manner may be classified into slide triggering or press triggering.

The second terminal may detect a change of sensor signals and send detected sensor trigger information to the first terminal. It should be noted that multiple types of sensors may be triggered when a gesture slides across a terminal, and in this case, trigger information of the multiple types of sensors is sent to the first terminal together. In some embodiments of the present invention, the sensor trigger information may include but is not limited to trigger time, a trigger manner, and a sensor triggering type. Information about the sensor triggering type may include but is not limited to one or a combination of infrared triggering, light triggering, and image triggering. If the trigger manner is press triggering, the trigger time may be boundary time when the triggering starts or ends.

In some embodiments of the present invention, the parameter information in this embodiment of the present invention may include a device configuration parameter, and specific implementation of the sending, by the second terminal, parameter information to the first terminal may include sending, by the second terminal, the device configuration parameter to the first terminal, so that the first terminal displays, in an interface according to a device configuration parameter of the first terminal, received device configuration parameters of the second terminals, and the number of all the terminals, at least one arrangement manner containing all the terminals, for the user to select, and records an arrangement manner selected by the user.

When the terminals that participate in the acquiring of the gesture information are the first terminal and the multiple second terminals, each of the second terminals may send a device configuration parameter, for example, a terminal screen size parameter and a screen resolution, to the first terminal. The first terminal may calculate multiple possible arrangement manners of all the terminals according to the device configuration parameter of the first terminal, device configuration parameters of the second terminals, and the number of all the terminals and display the multiple arrangement manners of all the terminals in a visual manner for the user to select. When the number of the terminals is relatively small, all arrangement manners may be displayed, and when the number of the terminals is relatively large, a preferred arrangement manner may be displayed. After the user selects an arrangement manner, the first terminal may record the arrangement manner selected by the user.

In some embodiments of the present invention, the parameter information in this embodiment of the present invention includes a device configuration parameter, and specific implementation of the sending, by the second terminal, parameter information to the first terminal may include sending, by the second terminal, the device configuration parameter to the first terminal, so that the first terminal displays, in an interface according to received device configuration parameters of the second terminals and the number of second terminals, at least one arrangement manner containing the second terminals, for the user to select, and records an arrangement manner selected by the user.

When the terminals that participate in the acquiring of the gesture information are only the multiple second terminals, each of the second terminals may send a device configuration parameter, for example, a terminal screen size parameter and a screen resolution, to the first terminal. The first terminal may calculate possible arrangement manners of all the second terminals according to device configuration parameters of the second terminals and the number of the second terminals and display multiple arrangement manners of the second terminals in a visual manner for the user to select. When the number of the terminals is relatively small, all arrangement manners may be displayed, and when the number of the terminals is relatively large, a preferred arrangement manner may be displayed. After the user selects an arrangement manner, the first terminal may record the arrangement manner selected by the user.

In addition, in some embodiments of the present invention, specific implementation of the sending, by the second terminal, parameter information to the first terminal in this embodiment of the present invention may also include sending, by the second terminal, a position parameter of the second terminal to the first terminal, so that the first terminal calculates a current arrangement manner of all the terminals according to received position parameters of the second terminals, and records the current arrangement manner.

In this manner, the first terminal does not need to calculate and display multiple arrangement manners of the terminals according to the device configuration parameters of the second terminals and the number of terminals. Instead, after the user completes terminal arrangement, position parameters are sent to the first terminal by means of ultrasonic signals or other signals transmitted by the terminals to each other. The first terminal calculates a current arrangement manner of the terminals that participate in the acquiring of the gesture information, and records the current arrangement manner of the terminals that participate in the acquiring of the gesture information.

In this embodiment, a second terminal sends detected sensor trigger information to a first terminal, so that the first terminal determines, according to a recorded arrangement manner and the sensor trigger information, a type of a gesture that triggers a sensor. In a multi-terminal collaboration scenario, an air gesture operation saves an operation time of a user and improves operation efficiency. This embodiment of the present invention provides a simple and efficient manner to recognize a type of a gesture in multi-terminal collaboration, with high recognition efficiency.

Figure 14:
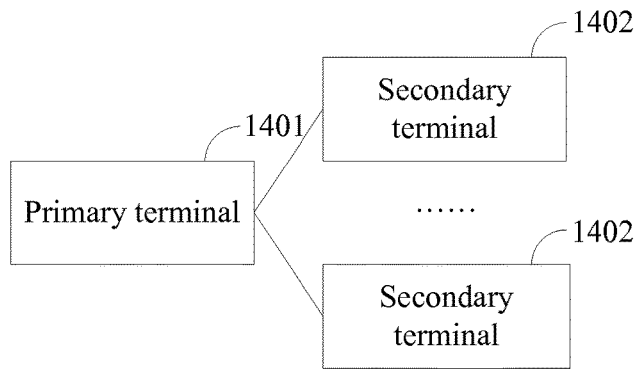
FIG. 14 is a schematic diagram of an embodiment of a system for recognizing a gesture in multi-terminal collaboration in the embodiments of the present invention.

Corresponding to the foregoing embodiments of the method for recognizing a gesture in multi-terminal collaboration, the embodiments of the present invention further provide an embodiment of a system for recognizing a gesture in multi-terminal collaboration, including a first terminal 1401 and at least one second terminal 1402, as shown in FIG. 14.

Figure 15:
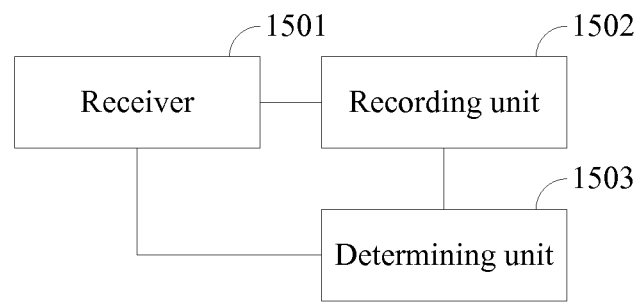
FIG. 15 is a schematic diagram of Embodiment 1 of a first terminal in the embodiments of the present invention.

In some embodiments of the present invention, a terminal meeting a preset condition among all terminals may be determined as a first terminal, and other terminals are determined as second terminals. That is, the first terminal is a terminal meeting the preset condition among all the terminals. As shown in FIG. 15, Embodiment 1 of the first terminal in the embodiments of the present invention may include a receiver 1501, a recording unit 1502, and a determining unit 1503.

The receiver 1501 is configured to receive a collaboration request activation signal triggered by a user.

The receiver 1501 is further configured to receive parameter information of terminals sent by the terminals.

The recording unit 1502 is configured to record, according to the parameter information received by the receiver, an arrangement manner of terminals that participate in acquiring of gesture information, where the terminals that participate in the acquiring of the gesture information includes all terminals or the terminals, and all the terminals include the first terminal and the terminals.

In some embodiments of the present invention, the parameter information includes a device configuration parameter, and the recording unit may include a first calculating subunit configured to calculate and display at least one arrangement manner of all the terminals according to a device configuration parameter of the terminal itself, device configuration parameters of the terminals received by the receiver, and the number of all the terminals; and a first recording subunit configured to record an arrangement manner selected by the user according to the display of the first calculating subunit.

Alternatively, in some embodiments of the present invention, the parameter information includes a device configuration parameter, and the recording unit may include a second calculating subunit configured to calculate and display at least one arrangement manner of the terminals, according to device configuration parameters of the terminals received by the receiver and the number of terminals that send device configuration parameters; and a second recording subunit configured to record an arrangement manner selected by the user according to the display of the second calculating subunit.

The receiver 1501 is further configured to receive sensor trigger information sent by at least one terminal.

The determining unit 1503 is configured to determine, according to the arrangement manner recorded by the recording unit and the sensor trigger information received by the receiver, a type of a gesture that triggers a sensor.

In some embodiments of the present invention, the sensor trigger information may include: trigger time, a trigger manner, and a sensor triggering type; information about the sensor triggering type includes one or a combination of infrared triggering, light triggering, and image triggering.

Figure 16:
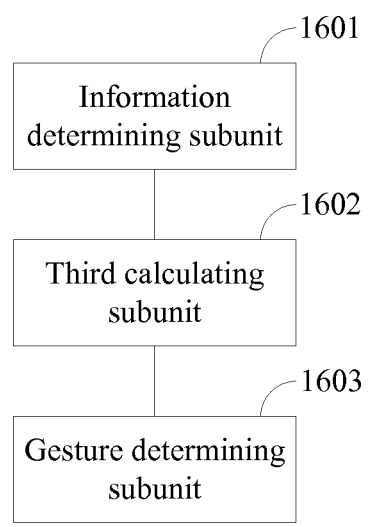
FIG. 16 is a schematic diagram of Embodiment 2 of the first terminal in the embodiments of the present invention.

As shown in FIG. 16, in Embodiment 2 of the first terminal in the embodiments of the present invention, the determining unit may include an information determining subunit 1601 configured to acquire first sensor trigger information of each triggered terminal from at least one piece of sensor trigger information detected by each triggered terminal, where the first sensor trigger information is provided by a sensor of a highest priority of each terminal; a third calculating subunit 1602 configured to determine a sliding direction of the gesture and calculate a trigger time difference between adjacent triggered terminals along the sliding direction of the gesture according to the arrangement manner recorded by the recording unit and trigger time that is contained in the first sensor trigger information of each triggered terminal, where the first sensor trigger information of each triggered terminal is determined by the information determining subunit; and a gesture determining subunit 1603 configured to determine, according to the sliding direction of the gesture and the trigger time difference that are determined by the third calculating subunit, the type of the gesture that triggers the sensor, where the type of the gesture includes a slide gesture, a zoom gesture, and a rotate gesture.

In some embodiments of the present invention, a time determining unit may further be included, where the time determining unit is configured to determine that time of the terminal itself is synchronized with time of each terminal; and in this case, the third calculating subunit is configured to, when the time determining unit determines that time is synchronized, determine the sliding direction of the gesture and calculate the trigger time difference between adjacent triggered terminals along the sliding direction of the gesture according to the arrangement manner recorded by the recording unit and the trigger time that is contained in the first sensor trigger information of each triggered terminal, where the first sensor trigger information of each triggered terminal is determined by the information determining subunit.

The type of the gesture that can be determined by the gesture determining subunit 1603 includes but is not limited to a slide gesture, a zoom gesture, or a rotate gesture. The gesture determining subunit 1603 may be configured to determine that the type of the gesture that triggers the sensor is slide gesture, when the gesture slides in a unidirectional manner and the first terminal determines that the trigger time difference is within a preset time range; determine that the type of the gesture that triggers the sensor is a zoom-in gesture, when the gesture includes a first gesture and a second gesture, the first gesture and the second gesture slide apart from each other, and both the first gesture and the second gesture are slide gestures; and determine that the type of the gesture that triggers the sensor is a zoom-out gesture, when the first gesture and the second gesture slide toward each other, and both the first gesture and the second gesture are slide gestures; and determine that the type of the gesture that triggers the sensor is rotate gesture, when a sliding direction of the first gesture is different from a sliding direction of the second gesture, a start terminal of the first gesture is different from a start terminal of the second gesture, an end terminal of the first gesture is different from an end terminal of the second gesture, and the first terminal determines that both the first gesture and the second gesture are slide gestures and a difference between trigger time of the end terminal of the first gesture and that of the end terminal of the second gesture is less than a preset threshold.

In this embodiment, a first terminal can recognize an air gesture of a user. An air gesture operation saves an operation time of the user, improves operation efficiency, and can be efficiently applied in a work scenario in which more than two terminals collaborate. In this embodiment, the first terminal implements simple and efficient recognition of a type of a gesture in multi-terminal collaboration, with high recognition efficiency.

Figure 17:
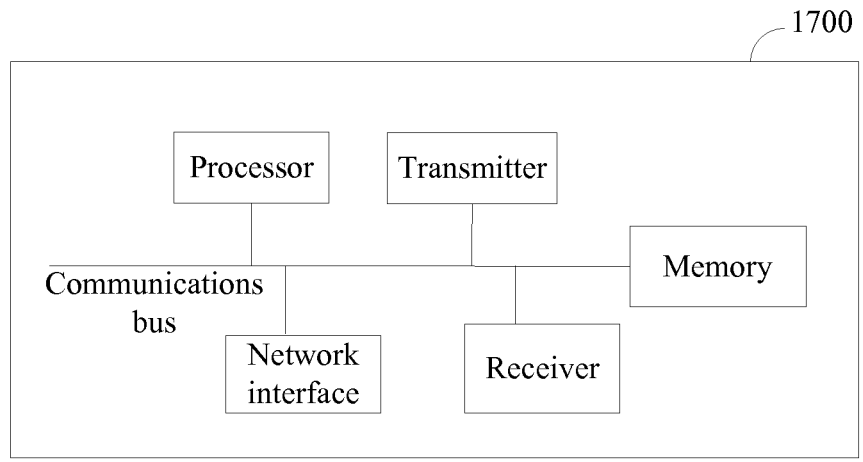
FIG. 17 is a schematic diagram of Embodiment 3 of the first terminal in the embodiments of the present invention.

The foregoing describes the first terminal in the embodiments of the present invention from the perspective of a modular functional entity. The following describes the first terminal in the embodiments of the present invention from the perspective of hardware processing. As shown in FIG. 17, Embodiment 3 of a first terminal 1700 in the embodiments of the present invention may include a transmitter, a receiver, a processor, at least one network interface or other communications interface, a memory, and at least one communications bus configured to implement connection and communication between these apparatuses. The transmitter is configured to send data, the receiver is configured to receive the data, and the processor is configured to execute an executable module, for example, a computer program, stored in the memory. The memory may include a high-speed random access memory (RAM), and may also include a non-volatile memory, for example, at least one disk memory. Through the at least one network interface (which may be wired or wireless), a communication connection between a system gateway and at least one other network element may be implemented by using the Internet, a wide area network, a local area network, a metropolitan area network, and the like.

With reference to a schematic composition diagram of the first terminal 1700 shown in FIG. 17, in some implementation manners, the memory stores a program instruction, and the program instruction may be executed by the processor, the transmitter, and the receiver, where the receiver is configured to receive a collaboration request activation signal triggered by a user; the receiver is further configured to receive parameter information of terminals sent by the terminals; the processor is configured to record, according to the parameter information received by the receiver, an arrangement manner of terminals that participate in acquiring of gesture information, where the terminals that participate in the acquiring of the gesture information includes all terminals or the terminals, and all the terminals include the terminal itself and the terminals; the receiver is further configured to receive sensor trigger information sent by at least one terminal; and the processor is further configured to determine, according to the arrangement manner recorded by the processor and the sensor trigger information received by the receiver, a type of a gesture that triggers a sensor.

The processor is configured to, when the parameter information includes a device configuration parameter, calculate and display at least one arrangement manner of all the terminals according to a device configuration parameter of the first terminal, device configuration parameters of the terminals received by the receiver, and the number of all the terminals; and record an arrangement manner selected by the user according to the display of the processor.

The processor is configured to, when the parameter information includes a device configuration parameter, calculate and display at least one arrangement manner of the terminals, according to device configuration parameters of the terminals received by the receiver and the number of terminals that send device configuration parameters; and record an arrangement manner selected by the user according to the display of the processor.

The processor is further configured to acquire first sensor trigger information of each triggered terminal from at least one piece of sensor trigger information detected by each triggered terminal, where the first sensor trigger information is provided by a sensor of a highest priority of each terminal; determine a sliding direction of the gesture and calculate a trigger time difference between adjacent triggered terminals along the sliding direction of the gesture according to the arrangement manner recorded by the processor and trigger time that is contained in the first sensor trigger information of each triggered terminal, where the first sensor trigger information of each triggered terminal is determined by the processor; and determine, according to the sliding direction of the gesture and the trigger time difference that are determined by the processor, the type of the gesture that triggers the sensor, where the type of the gesture includes a slide gesture, a zoom gesture, and a rotate gesture.

The processor is further configured to determine that time of the terminal itself is synchronized with time of each terminal; and when the processor determines that time is synchronized, determine the sliding direction of the gesture and calculate the trigger time difference between adjacent triggered terminals along the sliding direction of the gesture according to the recorded arrangement manner and the trigger time that is contained in the determined first sensor trigger information of each triggered terminal.

The processor is further configured to determine that the type of the gesture that triggers the sensor is a slide gesture, when the gesture slides in a unidirectional manner and the first terminal determines that the trigger time difference is within a preset time range; determine that the type of the gesture that triggers the sensor is a zoom-in gesture, when the gesture includes a first gesture and a second gesture, the first gesture and the second gesture slide apart from each other, and both the first gesture and the second gesture are slide gestures; determine that the type of the gesture that triggers the sensor is a zoom-out gesture, when the first gesture and the second gesture slide toward each other, and both the first gesture and the second gesture are slide gestures; and determine that the type of the gesture that triggers the sensor is a rotate gesture, when a sliding direction of the first gesture is different from a sliding direction of the second gesture, a start terminal of the first gesture is different from a start terminal of the second gesture, an end terminal of the first gesture is different from an end terminal of the second gesture, and a difference between trigger time of the end terminal of the first gesture and that of the end terminal of the second gesture is less than a preset threshold.

In this embodiment, a processor can recognize an air gesture of a user. An air gesture operation saves an operation time of the user, improves operation efficiency, and can be efficiently applied in a work scenario in which more than two terminals collaborate. A simple and efficient manner is provided to recognize a type of a gesture in multi-terminal collaboration, with high recognition efficiency by using the following technical solution. After a first terminal records an arrangement manner of terminals that participate in acquiring of gesture information and when a user makes an air gesture to trigger a sensor of each terminal, a type of the gesture that triggers the sensor can be determined according to sensor trigger information detected by each triggered terminal.

Figure 18:
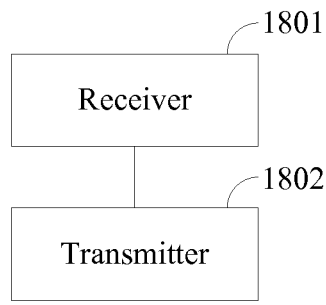
FIG. 18 is a schematic diagram of Embodiment 1 of a second terminal in the embodiments of the present invention.

In some embodiments of the present invention, a terminal meeting a preset condition among all terminals may be determined as a first terminal, and other terminals are determined as second terminals. That is, the first terminal is a terminal meeting the preset condition among all the terminals. As shown in FIG. 18, an embodiment of a second terminal in the embodiments of the present invention may include a receiver 1801 configured to receive a collaboration request activation signal; and a transmitter 1802 configured to send parameter information to a receiving terminal when the receiver receives the collaboration request activation signal, so that the receiving terminal records, according to the received parameter information, an arrangement manner of terminals that participate in acquiring of gesture information, where the terminals that participate in the acquiring of the gesture information include all terminals or terminals sending parameter information, and all the terminals include the terminals sending parameter information and the receiving terminal; and the transmitter is further configured to send detected sensor trigger information to the receiving terminal when it is detected that a sensor is triggered, so that the receiving terminal determines, according to the recorded arrangement manner and the acquired sensor trigger information, a type of a gesture that triggers the sensor.

The sensor trigger information may include: trigger time, a trigger manner, and a sensor triggering type; information about the sensor triggering type includes one or a combination of infrared triggering, light triggering, and image triggering.

In some embodiments of the present invention, the transmitter in this embodiment of the present invention may be configured to send a device configuration parameter to the receiving terminal, so that the receiving terminal displays, in an interface according to a device configuration parameter of the receiving terminal, received device configuration parameters of the terminals, and the number of all the terminals, at least one arrangement manner containing all the terminals, for a user to select, and records an arrangement manner selected by the user.

In some embodiments of the present invention, the transmitter in this embodiment of the present invention may also be configured to send a device configuration parameter to the receiving terminal, so that the receiving terminal displays, in an interface according to received device configuration parameters of the terminals and the number of terminals sending device configuration parameters, at least one arrangement manner containing the terminals sending device configuration parameters, for a user to select, and records an arrangement manner selected by the user.

Figure 19:
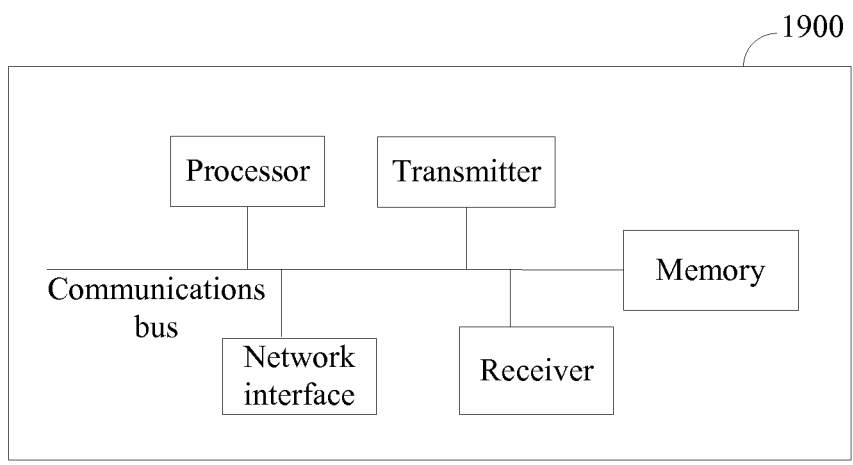
FIG. 19 is a schematic diagram of Embodiment 2 of the second terminal in the embodiments of the present invention.

The foregoing describes the second terminal in the embodiments of the present invention from the perspective of a modular functional entity. The following describes the second terminal in the embodiments of the present invention from the perspective of hardware processing. As shown in FIG. 19, Embodiment 2 of a second terminal 1900 in the embodiments of the present invention may include a transmitter, a receiver, a processor, at least one network interface or communications interface, a memory, and at least one communications bus configured to implement connection and communication between these apparatuses. The transmitter is configured to send data, the receiver is configured to receive the data, and the processor is configured to execute an executable module, for example, a computer program, stored in the memory. The memory may include a high-speed RAM, and may also include a non-volatile memory, for example, at least one disk memory. Through the at least one network interface (which may be wired or wireless), a communication connection between a system gateway and at least one other network element may be implemented by using the Internet, a wide area network, a local area network, a metropolitan area network, and the like.

With reference to a schematic composition diagram of the second terminal 1900 shown in FIG. 19, in some implementation manners, the memory stores a program instruction, and the program instruction may be executed by the processor, the transmitter, and the receiver, where the receiver is configured to receive a collaboration request activation signal; and the transmitter is configured to send parameter information to a receiving terminal when the receiver receives the collaboration request activation signal, so that the receiving terminal records, according to the received parameter information, an arrangement manner of terminals that participate in acquiring of gesture information, where the terminals that participate in the acquiring of the gesture information include all terminals or terminals sending parameter information, and all the terminals include the terminals sending parameter information and the receiving terminal; and the transmitter is further configured to send detected sensor trigger information to the receiving terminal when it is detected that a sensor is triggered, so that the receiving terminal determines, according to the recorded arrangement manner and the acquired sensor trigger information, a type of a gesture that triggers the sensor.

The transmitter is configured to send a device configuration parameter to the receiving terminal, so that the receiving terminal displays, in an interface according to a device configuration parameter of the receiving terminal, received device configuration parameters of the terminals, and the number of all the terminals, at least one arrangement manner containing all the terminals, for a user to select, and records an arrangement manner selected by the user.

The transmitter is also configured to send a device configuration parameter to the receiving terminal, so that the receiving terminal displays, in an interface according to received device configuration parameters of the terminals and the number of terminals sending device configuration parameters, at least one arrangement manner containing the terminals sending device configuration parameters, for a user to select, and records an arrangement manner selected by the user.

The sensor trigger information sent by the transmitter includes trigger time, a trigger manner, and a sensor triggering type; the sensor triggering type includes one or a combination of infrared triggering, light triggering, and image triggering.

In this embodiment, a processor sends detected sensor trigger information to a first terminal, so that the first terminal determines, according to a recorded arrangement manner and the sensor trigger information, a type of a gesture that triggers a sensor. In a multi-terminal collaboration scenario, an air gesture operation saves an operation time of a user and improves operation efficiency. This embodiment of the present invention provides a simple and efficient manner to recognize a type of a gesture in multi-terminal collaboration, with high recognition efficiency.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a RAM, a magnetic disk, or an optical disc.

It should be further noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the presence of additional identical elements in the process, method, article, or device that includes the element.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for recognizing a gesture based on multi-terminal collaboration, comprising:
   receiving, by a first terminal after receiving a collaboration request activation signal triggered by a user, parameter information of second terminals sent by the second terminals, wherein the parameter information of the second terminals comprises terminal screen sizes and screen resolutions of the second terminals;
   calculating multiple arrangement manners of the first terminal and the second terminals based at least in part on the terminal screen sizes and the screen resolutions of the second terminals;
   receiving a user selection of one of the multiple arrangement manners to use as an arrangement manner of terminals that participate in acquiring of gesture information;
   recording, by the first terminal according to the parameter information of the second terminals and the user selection, the arrangement manner of the terminals that participate in acquiring of the gesture information, wherein the terminals that participate in the acquiring of the gesture information comprise all terminals or the second terminals, and all the terminals comprise the first terminal and the second terminals;
   receiving, by the first terminal, sensor trigger information sent by at least one second terminal; and
   determining, by the first terminal according to the recorded arrangement manner and the acquired sensor trigger information, a type of a gesture that triggers a sensor, and wherein determining, by the first terminal according to the recorded arrangement manner and the acquired sensor trigger information, the type of the gesture that triggers the sensor comprises:

acquiring, by the first terminal, first sensor trigger information of each triggered terminal from at least one piece of sensor trigger information detected by each triggered terminal, wherein the first sensor trigger information is provided by the sensor of a highest priority of each terminal;

determining, by the first terminal, a sliding direction of the gesture and calculating a trigger time difference between adjacent triggered terminals along the sliding direction of the gesture according to the recorded arrangement manner and trigger time that is contained in the first sensor trigger information of each triggered terminal; and determining, by the first terminal according to the sliding direction of the gesture and the trigger time difference, the type of the gesture that triggers the sensor.

2. The method according to claim 1, wherein the parameter information comprises a device configuration parameter, and wherein recording, by the first terminal according to the received parameter information of the second terminals and the user selection, the arrangement manner of the terminals that participate in acquiring of the gesture information comprises:

displaying, in an interface by the first terminal according to a device configuration parameter of the first terminal, received device configuration parameters of the second terminals, and the number of all the terminals, at least one arrangement manner containing all the terminals, for the user to select; and recording the arrangement manner selected by the user.

3. The method according to claim 1, wherein the parameter information comprises a device configuration parameter, and wherein recording, by the first terminal according to the received parameter information of the second terminals and the user selection, the arrangement manner of the terminals that participate in acquiring of the gesture information comprises:

displaying, in an interface by the first terminal according to received device configuration parameters of the second terminals and the number of the second terminals, at least one arrangement manner containing the second terminals, for the user to select; and recording the arrangement manner selected by the user.

4. The method according to claim 1, wherein before determining, by the first terminal, the sliding direction of the gesture and calculating the trigger time difference between the adjacent triggered terminals along the sliding direction of the gesture according to the recorded arrangement manner and the trigger time that is contained in the first sensor trigger information of each triggered terminal, the method further comprises determining that time of the first terminal is synchronized with time of the second terminal.

5. The method according to claim 1, wherein determining, by the first terminal according to the sliding direction of the gesture and the trigger time difference, the type of the gesture that triggers the sensor comprises:

determining that the type of the gesture that triggers the sensor is a slide gesture, when the gesture slides in a unidirectional manner and the first terminal determines that the trigger time difference is within a preset time range;

determining that the type of the gesture that triggers the sensor is a zoom-in gesture, when the gesture comprises a first gesture and a second gesture, the first gesture and the second gesture slide apart from each other, and both the first gesture and the second gesture are slide gestures;

determining that the type of the gesture that triggers the sensor is the zoom-out gesture, when the first gesture and the second gesture slide toward each other, and both the first gesture and the second gesture are slide gestures; and determining that the type of the gesture that triggers the sensor is a rotate gesture, when a sliding direction of the first gesture is different from a sliding direction of the second gesture, a start terminal of the first gesture is different from a start terminal of the second gesture, an end terminal of the first gesture is different from an end terminal of the second gesture, and the first terminal determines that both the first gesture and the second gesture are slide gestures and a difference between trigger time of the end terminal of the first gesture and that of the end terminal of the second gesture is less than a preset threshold.

6. A method for recognizing a gesture based on multi-terminal collaboration, comprising:

sending, by a second terminal after receiving a collaboration request activation signal, parameter information of the second terminal to a first terminal such that the first terminal records, according to parameter information of second terminals and a user selection, an arrangement manner of terminals that participate in acquiring of gesture information, wherein the parameter information of the second terminal comprises terminal screen sizes and screen resolutions of the second terminals, wherein multiple arrangement manners of the first terminal and the second terminals are calculated based at least in part on the terminal screen sizes and the screen resolutions of the second terminals, wherein the user selection of one of the multiple arrangement manners is received and is used as an arrangement manner of terminals that participate in acquiring gesture information, wherein the terminals that participate in the acquiring of the gesture information comprise all terminals or the second terminals, and all the terminals comprise the first terminal and the second terminals; and sending, by the second terminal when detecting that a sensor is triggered, detected sensor trigger information to the first terminal such that the first terminal determines, according to the recorded arrangement manner and the acquired sensor trigger information, a type of a gesture that triggers the sensor, and wherein determining, by the first terminal according to the recorded arrangement manner and the acquired sensor trigger information, the type of the gesture that triggers the sensor comprises:

acquiring, by the first terminal, first sensor trigger information of each triggered terminal from at least one piece of sensor trigger information detected by each triggered terminal, wherein the first sensor trigger information is provided by the sensor of a highest priority of each terminal;

determining, by the first terminal, a sliding direction of the gesture and calculating a trigger time difference between adjacent triggered terminals along the sliding direction of the gesture according to the recorded arrangement manner and trigger time that is contained in the first sensor trigger information of each triggered terminal; and determining, by the first terminal according to the sliding direction of the gesture and the trigger time difference, the type of the gesture that triggers the sensor.

7. The method according to claim 6, wherein the parameter information comprises a device configuration parameter, and wherein sending, by the second terminal, the parameter information to the first terminal comprises sending, by the second terminal, the device configuration parameter to the first terminal such that the first terminal displays, in an interface according to a device configuration parameter of the first terminal, received device configuration parameters of the second terminals, and the number of all the terminals, at least one arrangement manner containing all the terminals, for a user to select, and records the arrangement manner selected by the user.

8. The method according to claim 6, wherein the parameter information comprises a device configuration parameter, and wherein sending, by the second terminal, the parameter information to the first terminal comprises sending, by the second terminal, the device configuration parameter to the first terminal such that the first terminal displays, in an interface according to received device configuration parameters of the second terminals and the number of the second terminals, at least one arrangement manner containing the second terminals, for the user to select, and records the arrangement manner selected by the user.

9. A terminal, comprising:
a computer processor;
a receiver coupled to the computer processor; and
a memory coupled to the computer processor,
wherein the receiver is configured to receive a collaboration request activation signal triggered by a user,
wherein the receiver is further configured to receive parameter information of terminals sent by the terminals,
wherein the parameter information of the terminals comprises terminal screen sizes and screen resolutions of the terminals,
wherein the computer processor is configured to calculate multiple arrangements of the terminals based at least in part on the terminal screen sizes and the screen resolutions of the terminals,
wherein the receiver is configured to receive a user selection of one of the multiple arrangement manners to use as an arrangement manner of terminals that participate in acquiring of gesture information,
wherein the memory is configured to record, according to the parameter information received by the receiver and the user selection, the arrangement manner of the terminals that participate in acquiring of the gesture information,
wherein the terminals that participate in the acquiring of the gesture information comprises all terminals or the terminals, and all the terminals comprise the terminal itself and the terminals,
wherein the receiver is further configured to receive sensor trigger information sent by at least one terminal,
wherein the computer processor is configured to determine, according to the arrangement manner recorded by the memory and the sensor trigger information received by the receiver, a type of a gesture that triggers a sensor, and wherein the computer processor is further configured to:
acquire first sensor trigger information of each triggered terminal from at least one piece of sensor trigger information detected by each triggered terminal, wherein the first sensor trigger information is provided by a sensor of a highest priority of each terminal;
determine a sliding direction of the gesture;
calculate a trigger time difference between adjacent triggered terminals along the sliding direction of the gesture according to the arrangement manner recorded by the memory and trigger time that is contained in the first sensor trigger information of each triggered terminal; and
determine, according to the sliding direction of the gesture and the trigger time difference, the type of the gesture that triggers the sensor, wherein the type of the gesture comprises a slide gesture, a zoom gesture, and a rotate gesture.

10. The terminal according to claim 9, wherein the parameter information comprises a device configuration parameter, and wherein the computer processor is further configured to:
calculate and display at least one arrangement manner of all the terminals according to the device configuration parameter of the terminal itself, device configuration parameters of the terminals received by the receiver, and the number of all the terminals; and
record the arrangement manner selected by the user according to the display.

11. The terminal according to claim 9, wherein the parameter information comprises a device configuration parameter, and wherein the computer processor is further configured to:
calculate and display at least one arrangement manner of the terminals, according to device configuration parameters of the terminals received by the receiver and the number of terminals that send the device configuration parameters; and
record the arrangement manner selected by the user according to the display.

12. The terminal according to claim 9, further comprising a clock coupled to the computer processor and configured to determine that time of the terminal itself is synchronized with time of each terminal, and wherein the computer processor is further configured to, when the clock determines that time is synchronized, determine the sliding direction of the gesture and calculate the trigger time difference between adjacent triggered terminals along the sliding direction of the gesture according to the arrangement manner recorded by the memory and the trigger time that is contained in the first sensor trigger information of each triggered terminal.

13. The terminal according to claim 9, wherein the computer processor is further configured to:
determine that the type of the gesture that triggers the sensor is slide gesture, when the gesture slides in a unidirectional manner and determine that the trigger time difference is within a preset time range;
determine that the type of the gesture that triggers the sensor is the zoom-in gesture, when the gesture comprises a first gesture and a second gesture, the first gesture and the second gesture slide apart from each other, and both the first gesture and the second gesture are slide gestures;
determine that the type of the gesture that triggers the sensor is zoom-out gesture, when the first gesture and the second gesture slide toward each other, and both the first gesture and the second gesture are slide gestures; and determine that the type of the gesture that triggers the sensor is the rotate gesture, when a sliding direction of the first gesture is different from a sliding direction of the second gesture, a start terminal of the first gesture is different from a start terminal of the second gesture, an end terminal of the first gesture is different from an end terminal of the second gesture, and determine that both the first gesture and the second gesture are slide gestures and a difference between trigger time of the end terminal of the first gesture and that of the end terminal of the second gesture is less than a preset threshold.

14. A terminal, comprising:

a receiver configured to receive a collaboration request activation signal; and a transmitter configured to send parameter information to a receiving terminal when the receiver receives the collaboration request activation signal such that the receiving terminal records, according to the received parameter information, an arrangement manner of terminals that participate in acquiring of gesture information, wherein the received parameter information comprises terminal screen sizes and screen resolutions, wherein multiple arrangement manners of the terminals are calculated based at least in part on the terminal screen sizes and the screen resolutions, wherein a user selection of one of the multiple arrangement manners is used as the arrangement manner of the terminals that participate in acquiring the gesture information, wherein the terminals that participate in the acquiring of the gesture information comprise all terminals or terminals sending parameter information, and all the terminals comprise the terminals sending parameter information and the receiving terminal, and wherein the transmitter is further configured to send detected sensor trigger information to the receiving terminal when it is detected that a sensor is triggered such that the receiving terminal determines, according to the recorded arrangement manner and the acquired sensor trigger information, a type of a gesture that triggers the sensor, and wherein determining, by the receiving terminal according to the recorded arrangement manner and the acquired sensor trigger information, the type of the gesture that triggers the sensor comprises:

acquiring, by the receiving terminal, first sensor trigger information of each triggered terminal from at least one piece of sensor trigger information detected by each triggered terminal, wherein the first sensor trigger information is provided by the sensor of a highest priority of each terminal;

determining, by the receiving terminal, a sliding direction of the gesture and calculating a trigger time difference between adjacent triggered terminals along the sliding direction of the gesture according to the recorded arrangement manner and trigger time that is contained in the first sensor trigger information of each triggered terminal; and determining, by the receiving terminal according to the sliding direction of the gesture and the trigger time difference, the type of the gesture that triggers the sensor.

15. The terminal according to claim 14, wherein the transmitter is configured to send a device configuration parameter to the receiving terminal such that the receiving terminal displays, in an interface according to a device configuration parameter of the receiving terminal, received device configuration parameters of the terminals, and the number of all the terminals, at least one arrangement manner containing all the terminals, for a user to select, and records the arrangement manner selected by the user.

16. The terminal according to claim 14, wherein the transmitter is configured to send a device configuration parameter to the receiving terminal such that the receiving terminal displays, in an interface according to received device configuration parameters of the terminals and the number of terminals sending device configuration parameters, at least one arrangement manner containing the terminals sending device configuration parameters for a user to select, and records the arrangement manner selected by the user.

* * * * *